(12) United States Patent
Potash et al.

(10) Patent No.: US 10,726,113 B2
(45) Date of Patent: *Jul. 28, 2020

(54) SYSTEMS AND METHODS OF VERIFYING AN AUTHENTICATED DOCUMENT BIOSIGNATURE GLYPH CONTAINING A SELECTED IMAGE

(71) Applicant: Certify Global Inc., Rockville, MD (US)

(72) Inventors: Marc Potash, Rockville, MD (US); Preetham Gowda, Germantown, MD (US)

(73) Assignee: Certify Global Inc., Rockville, MD (US)

( * ) Notice: Subject to any disclaimer, the term of this patent is extended or adjusted under 35 U.S.C. 154(b) by 138 days.

This patent is subject to a terminal disclaimer.

(21) Appl. No.: 15/483,387

(22) Filed: Apr. 10, 2017

(65) Prior Publication Data

US 2017/0213022 A1 Jul. 27, 2017

Related U.S. Application Data

(63) Continuation-in-part of application No. 14/553,529, filed on Nov. 25, 2014, now Pat. No. 9,652,633.

(51) Int. Cl.
*G06F 21/32* (2013.01)
*G06K 9/00* (2006.01)
(Continued)

(52) U.S. Cl.
CPC .............. *G06F 21/32* (2013.01); *G06F 21/10* (2013.01); *G06K 9/00885* (2013.01); *G06K 9/00892* (2013.01); *H04L 63/0861* (2013.01); *G06F 2221/2115* (2013.01); *G06K 2009/0059* (2013.01); *H04L 63/107* (2013.01)

(58) Field of Classification Search
CPC .. G06F 21/32; G06F 21/10; G06F 2221/2115; G06K 9/00885; G06K 9/00892; G06K 2009/0059; H04L 63/0861; H04L 63/107
See application file for complete search history.

(56) References Cited

U.S. PATENT DOCUMENTS 5,031,214 A 7/1991 Dziewit et al.
6,871,276 B1 * 3/2005 Simon ................. H04L 63/0823
380/30
(Continued)

*Primary Examiner* — Ali S Abyaneh
*Assistant Examiner* — Alexander R Lapian
(74) *Attorney, Agent, or Firm* — The Marbury Law Group, PLLC

(57) ABSTRACT

In systems and methods of managing a document with an authenticated document biosignature, a processor of a verification device may receive an image based on a user selection. The processor may calculate a base verification score associated with a user based on at least one identification input, the identification input including one or more identification features, wherein at least one of the identification features includes a biometric identification feature. The processor of the verification device may generate a glyph based on the selected image, the base verification score and the at least one identification input. The glyph may be associated with a document, and may be used to verify the identity of the user associated with the glyph.

22 Claims, 9 Drawing Sheets

(51) Int. Cl.
*G06F 21/10* (2013.01)
*H04L 29/06* (2006.01)

(56) References Cited

U.S. PATENT DOCUMENTS

| | | | |
|---|---|---|---|
| 6,871,287 B1 | 3/2005 | Ellingson | |
| 7,181,017 B1 | 2/2007 | Nagel et al. | |
| 7,313,697 B2 | 12/2007 | Meyer et al. | |
| 7,346,472 B2 | 3/2008 | Moskowitz et al. | |
| 7,587,605 B1 | 9/2009 | Venkatesan et al. | |
| 7,620,555 B1 | 11/2009 | Plotkin | |
| 7,660,700 B2 | 2/2010 | Moskowitz et al. | |
| 7,664,957 B2 | 2/2010 | Gentry et al. | |
| 7,784,102 B2 | 8/2010 | Sperry | |
| 7,805,377 B2 | 9/2010 | Feisher | |
| 7,818,583 B2 | 10/2010 | Igarashi | |
| 7,877,296 B2 | 1/2011 | Sherwin et al. | |
| 7,949,494 B2 | 5/2011 | Moskowitz et al. | |
| 8,000,503 B2 | 8/2011 | Kamata et al. | |
| 8,214,175 B2 | 7/2012 | Moskowitz et al. | |
| 8,224,753 B2 | 7/2012 | Atef et al. | |
| 8,228,295 B2 | 7/2012 | Su et al. | |
| 8,316,237 B1 | 11/2012 | Felsher et al. | |
| 8,402,040 B2 * | 3/2013 | Mallalieu | G06F 21/32 707/758 |
| 8,498,941 B2 | 7/2013 | Felsher | |
| 9,189,788 B1 | 11/2015 | Robinson et al. | |
| 9,240,058 B1 | 1/2016 | Amacker et al. | |
| 9,390,327 B2 | 7/2016 | Gottemukkula et al. | |
| 2003/0014372 A1 * | 1/2003 | Wheeler | G06F 21/32 705/71 |
| 2009/0006230 A1 | 1/2009 | Lyda et al. | |
| 2013/0015946 A1 * | 1/2013 | Lau | G07C 9/00 340/5.2 |
| 2014/0025443 A1 * | 1/2014 | Onischuk | G07C 13/00 705/12 |
| 2014/0237568 A1 * | 8/2014 | Sista | H04L 63/0876 726/6 |
| 2014/0281946 A1 * | 9/2014 | Avni | G06T 1/0021 715/268 |
| 2015/0003668 A1 * | 1/2015 | Carper | G06T 1/0028 382/100 |
| 2015/0095986 A1 * | 4/2015 | Karpey | H04L 63/08 726/4 |
| 2015/0131899 A1 * | 5/2015 | Lu | G06K 9/6256 382/159 |
| 2015/0358400 A1 | 12/2015 | Bartlett, II et al. | |
| 2016/0148039 A1 | 5/2016 | Potash et al. | |

* cited by examiner

SYSTEMS AND METHODS OF VERIFYING AN AUTHENTICATED DOCUMENT BIOSIGNATURE GLYPH CONTAINING A SELECTED IMAGE

RELATED APPLICATIONS

This application is a continuation-in-part of U.S. patent application Ser. No. 14/553,529, now patented U.S. Pat. No. 9,652,633, entitled "Systems and Methods of Verifying an Authenticated Document Biosignature," filed Nov. 25, 2014, which is assigned to the assignee hereof and is hereby by incorporated by reference in its entirety.

TECHNICAL BACKGROUND

Authenticating the identity of an individual is an increasingly important function for operators of communication networks, providers of services over communication networks, entities who receive payment for products and services over communications networks, and others due to the growing problems of identity theft and identity fraud. The theft or misrepresentation of information about the identity of an individual used to obtain access to information, products, services, or anything else of value (e.g., personally identifiable information, etc.), generally referred to as identify theft and identify fraud, are serious problems that may cost companies millions of dollars every year, and may affect a wide range of enterprises, including online retailers, insurance companies, healthcare companies, financial institutions, government agencies, and others. For example, according to the Department of Justice, about 8.6 million households in the United States experienced some form of identity theft in 2010. The total financial loss resulting from this theft was approximately $13.3 billion. According to the Federal Bureau of Investigation, insurance fraud costs the United States over $40 billion per year, and healthcare fraud costs an estimated $80 billion a year.

Various methods of authentication of the identity of an individual have been used in an effort to prevent identity theft and identity fraud. For example, access to services over a communication network may be controlled by requiring a username (i.e., a unique identifier) and a password (i.e., an additional piece of "secret information"). Further, some additional non-public information may be required by the service provider, such as a social security number, an answer to a "secret question" beyond a password, and the like. However, such security measures may be vulnerable to identity theft and identity fraud because ensuring the security of such information is difficult. In addition, various types of biometric identifiers (e.g., unique physical characteristics) have been used to assist in verifying an authentication, ranging from non-electronic fingerprinting to electronic voice recognition, thumb scans, iris scans, palm scans, face scans, physiological scans, and the like. No identifier, however, is foolproof, whether non-biometric or biometric. Every biometric reader may be subject to "false accept" and "false reject" errors, and as with non-biometric identifiers, ensuring the security of biometric identifiers is difficult. Further, as with non-biometric identifiers, the reliability of biometric identifiers may change depending on the particular transaction in which the individual's identity is authenticated. The reliability of an individual's identity may change, for example, depending on whether the identity is always authenticated in the same location or is sometimes authenticated in different locations.

The authentication of individual signatures associated with documents poses additional challenges. While an individual's handwritten signature may be distinctive, a person's handwritten signature is rarely identical each time the person signs a document, making machine comparison of signatures more complex. Further, handwritten signatures may be subject to copying and fraud. Moreover, verifying an individual's handwritten signature by human visual comparison of samples is inexact and subject to error.

Congress overwhelmingly passed the Digital Signature Act in June 2000, and the law, which went into effect Oct. 1, 2000, gives electronically signed contracts the same legal weight as contracts written on paper and signed with a pen. Some consumer advocates worry that the law will make it easier for criminals to perpetrate fraud based on identity theft. Enthusiasts for the technology counter that criminals will find it more difficult to steal identities. It is possible that both are right. It might be harder for someone to steal your identity, but the consequences could be worse. It is possible for someone to take the identity of someone else online and sign their name and, for example, get a fraudulent mortgage. The misuse of computer networks, the internet, and various avenues within the online community in order to defraud potential victims of identity theft is classified as electronic (or online) forgery. Electronic forgery is quite common within the digital age, and can include the illegal and unlawful reproduction of endorsements in the form of electronic signatures in order to illicitly assume the identity of the victim of identity theft. Verifying the presence of an individual by biometrics may help prevent e-signature frauds. However, human involvement may be required to be sure that a signature is valid, a requirement that may apply to digital signatures as well as pen-and-paper ones.

OVERVIEW

In some embodiments, systems and methods of generating an authenticated document biosignature may include calculating, at a processor of a verification device, a base verification score associated with a user based on at least one identification input, the identification input including an identification feature, a feature validity rating, a source where the identification feature is received, and a source validity rating, generating at the verification device, a glyph based on the base verification score and the at least one identification input, and associating the glyph with a document. In some embodiments, the glyph may further include an encoding of the base verification score and the at least one identification input. In some embodiments, generating a glyph based on the base verification score and the at least one identification input may further include calculating a session verification score associated with the user based on the base verification score and at least one second identification input, the second identification input including a second identification feature, a second feature validity rating, a second source where the second identification feature is received, and a second source validity rating, and generating the glyph based on the base verification score, the at least one identification input, and the session verification score. A scan device may later scan the glyph associated with the document, and may extract one or more of the base verification score, the at least one identification input, and the session verification score from the scanned glyph. A verification device may use the extracted information to verify the identity of a user.

BRIEF DESCRIPTION OF THE DRAWINGS

The accompanying drawings, which are incorporated herein and constitute part of this specification, illustrate exemplary embodiments of the invention. Together with the general description given above and the detailed description given below, the drawings serve to explain features of the invention, and not to limit the disclosed embodiments.

DETAILED DESCRIPTION

The authentication of individual signatures associated with documents poses challenges. While an individual's handwritten signature may be distinctive, a person's handwritten signature is rarely identical each time the person signs a document, making machine comparison of signatures more complex. Further, handwritten signatures may be subject to copying and fraud. Moreover, verifying an individual's handwritten signature by human visual comparison of samples is inexact and subject to error.

In overview, the various embodiments include methods, and computing devices configured to implement the methods, of managing documents with an authenticated document biosignature for improved authentication of individual signatures or documents. A computing device (e.g., verification device having a processor, etc.) may be configured to receive a selected image, receive or generate identification inputs (e.g., biosignature, etc.), and calculate a base verification score. The computing device may use the base verification score, identification input, and the selected image to generate a glyph. The computing device may associate the generated glyph with the document that is to be authenticated. In some embodiments, associating the generated glyph with the document generates a document that has an authenticated document biosignature.

A computing device may scan the glyph associated with the document to extract various different types of information, such as a base verification score, identification features, identification feature validity rating, source information, source validity rating, session verification score, etc. The computing device may compare the extracted information with information stored in memory to generate comparison results, and use the generated comparison results to verify or authenticate the document. For example, the computing device may verify the authenticity of the glyph in response to determining that an extracted base verification score and identification input match a base verification score and identification input stored in memory.

In the various embodiments, any or all of various scores and features (e.g., base verification score, identification features, source information, session verification score, etc.), ratings (e.g., identification feature validity rating, source validity rating, etc.), and degrees of reliability, verifiability, etc., described in this application may be represented by one or more numerical values or symbols that are suitable for comparison or analysis.

Figure 1:
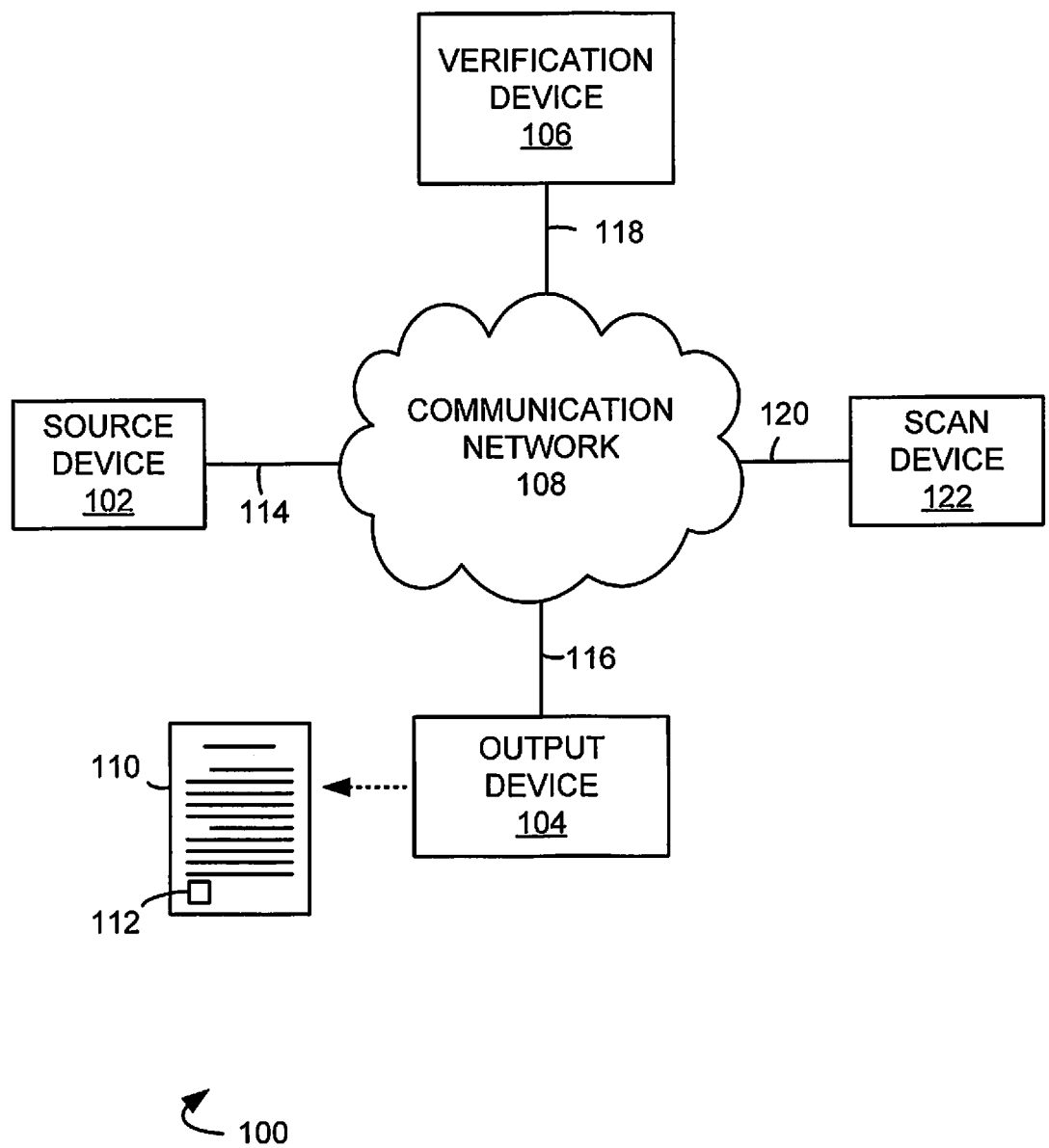
FIG. 1 illustrates a communication system of verifying an authenticated document biosignature suitable for use in various embodiments.

FIG. 1 illustrates an exemplary communication system 100 for verifying an authenticated document biosignature suitable for use in various embodiments. The communication system may include a source device 102, an output device 104, a verification device 106, a communication network 108, and a scan device 122. The source device 102 may be configured to receive an identification feature, and may include a computing device or computing platform such as a point-of-sale device, a desktop, laptop, palmtop, or tablet computing device, a personal digital assistant, an internet access device, a cell phone, a smart phone, a personal digital assistant, or another device capable of receiving an input including an identification feature, including combinations thereof. The source device 102 may include a processing system and a memory. The processing system may include a microprocessor and/or other circuitry to retrieve and execute software from storage, and the memory may include a disk drive, flash drive, memory circuitry, or other non-transitory memory device. The memory may store including computer-readable or processor-readable codes or instructions that may be used in the operation of the source device 102. The computer-readable or processor-readable codes or instructions may include computer programs, firmware, an operating system, utilities, drivers, network interfaces, applications, or some other type of codes or instructions. The source device 102 may further include other components such as a power management unit, a control interface unit, and the like. The source device 102 may include one or more devices for sampling, scanning or detecting and input, including biometric information. Such biometric information may include a fingerprint, a palm print, a voice sample, a vein pattern in a retina or in an extremity such as a hand or arm, a venous or arterial pulse, a blood pressure, an iris pattern, face recognition data, a handwriting or signature analysis, venous or arterial pulse, and the like, including combinations thereof.

The source device 102 may be located at a known or an identifiable location, such as a retail or a commercial location, an office, a home, a government facility, or another such location. The source device 102 may be of one or more types, which type(s) may be associated with a level of reliability. As one example, a source device type that is verified, inspected, or otherwise authorized may be associated with a relatively high level of reliability, whereas a source device type that is not verified, inspected, or otherwise authorized may be associated with a relatively low level of reliability. The source device 102 may further include a source validity rating, which may be based on at least one of the location of the source device 102 and the type of source device. The source device 102 may communicate with the communication network 108 over communication link 114.

The verification device 106 may include a processing node or other network element in communication with communication network 108 over communication link 118. The verification device 106 may be configured to verify an authentication, and to generate a glyph 112 based on the verified authentication. The verification device 106 may include a processor and associated circuitry to execute or direct the execution of computer-readable instructions, such as software, which may be retrieved from storage, which may include a disk drive, flash drive, memory circuitry, or some other non-transitory memory device, and which may be local or remotely accessible. The software may include computer programs, firmware, or some other form of non-transitory processor-readable or machine-readable instructions, and may include an operating system, utilities, drivers, network interfaces, applications, or some other type of software, including combinations thereof. The verification device 106 may receive instructions and other input at a user interface. Examples of the verification device 106 may include a standalone computing device, a computer system, and a network component, such as a server, and may be accessible, for example, by a wired or wireless connection, or through an indirect connection such as through a computer network or communication network 108.

The output device 104 may be configured to receive the glyph 112 from the verification device 106 (e.g., via the communication network 108). The output device 104 may further be configured to associate the glyph 112 with a document 110. Associating the glyph 112 with the document 110 may include producing a physical copy of the document showing the glyph 112, such as printing a document showing the glyph 112. Associating the glyph 112 with the document 110 may also include creating an electronic version of the document including the glyph (for example, a PDF format or other electronic document format, in which the glyph is displayed as part of the document). Associating the glyph 112 with the document 110 may also include generating a data association between the document and the glyph such that display or transmission of the document 110 necessarily includes display or transmission of the glyph 112. The document 110 may thus include a physical or electronic document.

The output device 104 may be in communication with the communication network 108 over communication link 116, and may include a processing system and a memory. The processing system may include a microprocessor and/or other circuitry to retrieve and execute software from storage, and the memory may include a disk drive, flash drive, memory circuitry, or other non-transitory memory device. The memory may store including computer-readable or processor-readable codes or instructions that may be used in the operation of the output device 104. The computer-readable or processor-readable codes or instructions may include computer programs, firmware, an operating system, utilities, drivers, network interfaces, applications, or some other type of codes or instructions. The output device 104 may further include other components such as a power management unit, a control interface unit, and the like. In some embodiments, the source device 102 and the output device 104 may be included in a combination device or in a single device.

In some embodiments, the verification device 106 may be configured to generate the glyph 112 based on a base verification score (which may be calculated at the verification device 106) and at least one identification input (which may be received at or from the source device 102).

In some embodiments, the glyph 112 may be or may include an image, a symbol, a picture, an icon, a sign, or any other similar visible impression or representation. In some embodiments, the glyph 112 may include a machine-readable encoding of verification information, such as an identification feature, a component of an identification input, a base verification score, and/or a session verification score. In some embodiments, the glyph 112 may include human-readable information, including letters, numbers, images, and other human-readable symbols and signs.

In some embodiments, the glyph 112 may include an encoding of the base verification score and the at least one identification input. The glyph 112 may include a machine-readable portion that may be scanned, and from which the base verification score and/or the at least one identification input may be extracted. In some embodiments, the glyph 112 may include an encoding of the base verification score, an identification input, and a session verification score (which may be generated at the verification device 106). In some embodiments, the glyph 112 may include any or all of an encoding of a unique transaction ID or session ID, system generated identifiers, document information or identifiers, a network address of the source device (e.g., an IP address associated with the source device), geographic information associated with the source device (e.g., geolocation information), chronological information (e.g., a date, time, and/or time zone), or any combination thereof. In various embodiments, the glyph 112 may function as a "biosignature" usable, for example, to authenticate a document, or to authenticate a user's endorsement of a document (e.g., signature of a contract).

The verification device 106 may be configured to receive a selection of an image (i.e., an image selection or a selected image). In some embodiments, the verification device 106 may receive an image based on a user selection, such as a user selection that is received at or from the source device 102. The selected image may, in some embodiments, represent or be associated with a human-recognizable image (i.e., an image that may be readily recognized, evaluated, or understood by a human user). The selected image may include a photograph, an icon, a logo, or another such image. In some embodiments, the selected image may represent, for example, a favorite sports team, music group, school, organization, product, company, or another similar image. In some embodiments, the verification device 106 may receive the image after or in response to an event, such as when the image is associated with a user account, upon creation of the user account, when the image is later added to an existing user account, etc.

In some embodiments, the verification device 106 may be configured to receive a selected image, and generate the glyph 112 based on the received image (e.g., such that the generated glyph 112 included or incorporates the received image, etc.). In some embodiments, the received image may be changed, modified, added to, subtracted from, or altered in another way as part of the operations of generating the glyph 112. In some embodiments, the verification device 106 may encode one or more information items into the received image as part of generating the glyph 112. Incorporating the selected image as part of the glyph 112 may enhance the usability of the glyph 112 by making the glyph 112 more recognizable to a human user, in addition to encoding the various information in the glyph 112. Further, incorporating the selected image as part of the glyph 112 may improve the effectiveness of the glyph 112 as evidence of a user authorization or endorsement of the document 110. For example, in addition to the information encoded into a glyph, a glyph incorporating the logo of a user's favorite sports team may provide greater evidence that associated with the glyph was "signed" by such user, whereas a glyph incorporating the logo of a rival sports team may provide greater evidence that such user has not authorized or endorsed the associated document.

The scan device 122 may be configured to scan a glyph associated with a document, and may further be configured to extract information encoded in the glyph, such as an identification feature, a component of an identification input, a base verification score, and/or a session verification score. The scan device may include an optical, infrared, ultraviolet, near-infrared or -ultraviolet, or another scanning device or sensor device that may scan the glyph. The scan device may include a function to extract information from a scanned glyph. The scan device may include a processing system and a memory. The processing system may include a microprocessor and/or other circuitry to retrieve and execute software from storage, and the memory may include a disk drive, flash drive, memory circuitry, or other non-transitory memory device. The memory may store including computer-readable or processor-readable codes or instructions that may be used in the operation of the scan device. The computer-readable or processor-readable codes or instructions may include computer programs, firmware, an operating system, utilities, drivers, network interfaces, applications, or some other type of codes or instructions. The scan device may further include other components such as a power management unit, a control interface unit, and the like. In some embodiments, the scan device may be included with the source device 102 and/or the output device 104 in a combination device or in a single device.

Communication network 108 may include a wired and/or wireless communication network, and may further include processing nodes, routers, gateways, and physical and/or wireless data links for carrying data among various network elements, including combinations thereof, and may include a local area network, a wide area network, and an internetwork (including the Internet). Wired network protocols that may be utilized by the communication network may include Transfer Control Protocol (TCP), Internet Protocol (IP), Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). The communication network may include a wireless network, including base stations, wireless communication nodes, telephony switches, internet routers, network gateways, computer systems, communication links, or some other type of communication equipment, and combinations thereof. Wireless network protocols that may be utilized by the communication network may include code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Worldwide Interoperability for Microwave Access (WiMAX), and Third Generation Partnership Project Long Term Evolution (3GPP LTE). The communication network may include combinations of the foregoing. Other network elements may be present in the communication network that are omitted for clarity, including additional processing nodes, routers, gateways, and physical and/or wireless data links, and in the case of wireless communications systems may further include base stations, base station controllers, gateways, call controllers, and location registers such as a home location register or visitor location register.

Communication links 114, 116, 118, and 120 may include wired or wireless communication links. Wired communication links may include, for example, twisted pair cable, coaxial cable or fiber optic cable, or combinations thereof. Wireless communication links may include a radio frequency, microwave, infrared, or other similar signal.

Other network elements may be present to facilitate communication in communication system 100 which are omitted for clarity, including additional processing nodes, routers, gateways, and physical and/or wireless data links for carrying data among the various network elements, and in the case of wireless communications systems may further include base stations, base station controllers, gateways, mobile switching centers, dispatch application processors, and location registers such as a home location register or visitor location register.

In some embodiments, to sign a document, a user may first authenticate his or her identity. The authentication may include collecting at least one identification input, for example, at a source device 102. The source device 102 may be configured to receive an identification feature from a user, and to communicate the identification feature to the verification device 106. The verification device 106 may be configured to receive the identification feature from the source device 102 (e.g., over communication network 108), and may be further configured to generate a base verification score associated with the user based on at least one identification input. The identification input may include the identification feature, a feature validity rating, and a source device validity rating.

In some embodiments, information, including information received at the source device 102, may be processed at the verification device 106 with respect to a multiplicity of biometric and non-biometric identifiers to generate a dynamic "base verification score" (which may be used as a starting point in analyzing individual's identity) and a "session verification score" (which may be used to analyze an individual's identity in connection with a particular transaction) to determine a probability of an individual's identity. Exemplary systems may be software and hardware agnostic, and may, for example, be used in connection with any operating system and any biometric device complying with such technical standards as ANSI/NIST-IT Biometric Standard, Data Format for the Interchange of Fingerprint, Facial & Other Biometric Information, ANSI/NIST-ITL 1-2011, Update: 2013, Incorporating ANSI/NIST-ITL 1-2011 Sup: Dental & ANSI/NIST-ITL 1-2011, and other internationally recognized biometric standards.

In some embodiments, a processor of the verification device 106 may calculate a base verification score associated with a user based on at least one identification input. The identification input may include one or more identification features, a feature validity rating, a source where the identification feature is received, and a source validity rating, wherein at least one identification feature includes a biometric identification feature. The verification device may receive an image based on a user selection. The verification device may generate a glyph based on the base verification score, the at least one identification input, and the selected image. The generated glyph may be associated with a document, for example, by an output device. The generated glyph may be associated with the document by the verification device, or by another suitable configured device. In some embodiments, the glyph may include an encoding of the base verification score and the at least one identification input, which encoding may be machine-readable to extract the base verification score and/or the at least one identification input. In some embodiments, the glyph may include an encoding of the base verification score, the at least one identification input, and a session verification score, which encoding may be machine-readable to extract the base verification score, the at least one identification input, and/or the session verification score.

Figure 2:
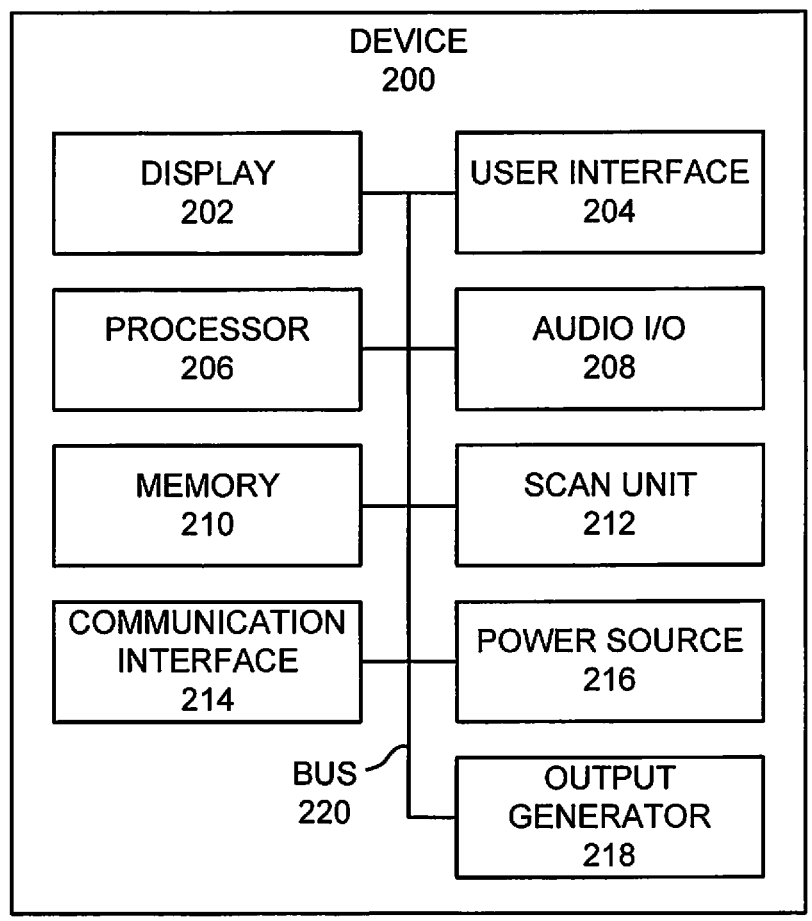
FIG. 2 illustrates a device suitable for use in various embodiments.

FIG. 2 illustrates an exemplary device 200 suitable for use with various embodiments. Examples of the device 200 may include the source device 102, the output device 104, and the scan device 122 illustrated in FIG. 1. The device 200 may include a display 202, a user interface 204, a processor 206, an audio input/output 208, a memory 210, a scan unit 212, a communication interface 214, and a power source 216. The display 202 may display information at the direction of processor 206, and may be coupled with a display driver (not illustrated) to control a display of information on the display 202, including text, images, video, and the like. The display 202 may be coupled with the user interface 204 to receive input, such as by a touch screen or similar device. Additionally, or alternatively, the user interface 204 may include one or more input devices by which the source device 200 may receive an input, such as a keyboard, a mouse, buttons, keys, knobs, sliders, and the like. The user interface 204 may be used to provide information to the source device 200, to answer questions and/or to respond to queries that may be displayed on the display 202, and to control the operation of the source device 200.

The audio input and output (I/O) 208 may include a speaker to produce sound and/or a microphone to receive sound input. The memory 210 may store data, and may include, for example, a disk drive, a flash drive, a solid state memory device, a memory circuitry, or some other non-transitory memory device, in various forms of volatile and non-volatile memory storage. The memory 210 may store software including, for example, computer programs, firmware, or some other form of non-transitory processor-readable or machine-readable instructions, and may include an operating system, utilities, drivers, network interfaces, applications, or some other type of software.

The scan unit 212 may include one or more devices to scan, detect, receive, etc. an identification input. The scan unit 212 may include a document scanner to receive an identification input such as a driver's license, a passport, a social security card, a utility bill (as evidence of an address), a smart card scanner, a barcode scanner, a credit card reader, a signature pad, and the like. The scan unit 212 may include a glyph scanner to scan a glyph associated with a document. The scan unit 212 may include one or more sensors or scanners to detect biometric information such as a fingerprint, a palm print, a voice sample, a vein pattern in a retina or in an extremity such as a hand or arm, a venous or arterial pulse, a blood pressure, an iris pattern, face recognition data, a handwriting or signature analysis, a DNA sample, and the like. Examples of the sensor include a camera (including visible light, infrared, ultraviolet, etc.), a scanner, a charge coupled device, a capacitive sensor, a touch screen input unit, a temperature sensor, a pressure sensor, a vibration sensor, an accelerometer, a voice sampler, a voiceprint analyzer, an iris pattern scanner, a vein pattern scanner, a blood pressure detector, a blood vessel pulse detector, a DNA sampler, a scale or other weight detector, a pulse oximeter, an electrocardiogram device, a blood pressure detector, a thermometer, a thermograph, a face recognition scanner, and so forth. The scan unit 212 may use, or may be combined with, the audio I/O 208 to receive voice information or other sound input. Other sensors and detectors are also possible, including combinations of the foregoing.

The communication interface 214 may include a wired and/or wireless communication interface to enable the source device 200 to communicate with another device, for example, directly or over a communication network (such as the communication network 108). The communication interface 214 may one or more transceivers (not illustrated) to enable the source device 200 to communicate wirelessly. Wireless communication may be short range or long range, and may include short-range communication with another device (e.g., using a short-range communication protocol such as WiFi, Bluetooth, Zigbee, IrDA, and the like) and long-range communication (e.g., using a cellular communication procotol such as GSM, WiMAX, LTE, LTE-Advanced, and the like).

The processor 206 may retrieve and execute software from the memory 210, process data, and may control the operation of elements 202, 204, 208, 210, 212, 214 and 216. Elements 202-216 may communicate over communication link 218, such as a communication bus. Each of the elements 202-216 may be disposed within, for example, a housing, but this is by no means a requirement or limitation, and the functions of source device 200 may be distributed over two or more devices that may communicate by a wired or wireless local connection, or over a wired or wireless communication network or another distributed communication system.

Figure 3:
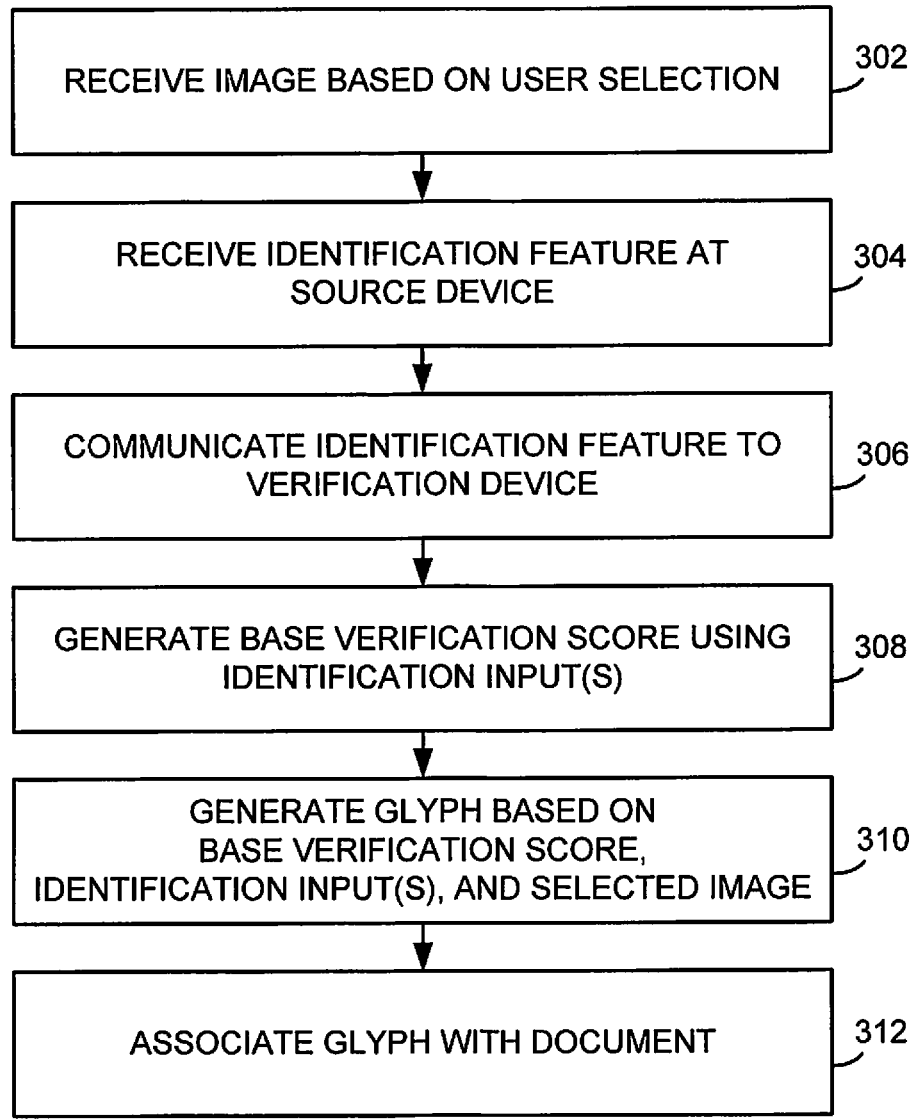
FIG. 3 illustrates a method of verifying an authenticated document biosignature according to various embodiments.

FIG. 3 illustrates a method 300 of verifying an authenticated document biosignature according to various embodiments. The method 300 may be implemented by a device processor (e.g., the processor 206 in FIG. 2, the processing system in FIG. 9, or another similar processor).

In block 302, a verification device (e.g., the verification device 106 illustrated in FIG. 1, etc.) may receive an image based on a user selection. The selected image may, in some embodiments, represent or be associated with an image (e.g., an image that may be readily recognized, evaluated, or understood by a human user, such as a photograph, an icon, a logo, etc.). In some embodiments, the selected image may represent, for example, a favorite sports team, music group, school, organization, product, company, or another similar image. In some embodiments, the verification device may be configured to receive the image based on a user selection that is received at a source device (e.g., the source device 102). In some embodiments, the verification device may be configured to receive the image as part of a process in which the image is associated with a user account (e.g., associated with a creation of the user account, or when the image is later added to an existing user account).

In block 304, a source device (e.g., the source device 102) may receive an identification feature from a user. The identification feature may include an identification feature, such as biometric information including a fingerprint, a palm print, a voice sample, a vein pattern in a retina or in an extremity such as a hand or arm, a venous or arterial pulse, a blood pressure, an iris pattern, face recognition data, a handwriting or signature analysis, and the like, including combinations thereof. The identification feature may further include demographic information, such as name, address, phone number, citizenship, and other demographic information, including combinations thereof. The identification feature may include a document or an identification number from a document, such as a driver's license, social security number, a passport, a utility account number (e.g., for a utility such as gas, electricity, telephone service, internet service, and the like).

In block 306, the identification feature may be sent to the verification device. For example, source device 102 may communicate the received identification feature to verification device 106 over communication network 108.

In block 308, the verification device may generate (or calculate) a base verification score associated with a user based one or more identification inputs. The identification input(s) may include the identification feature received at the source device, an identification feature validity rating, a source where the identification feature is received, and a source validity rating. The identification feature validity rating may include an evaluation of the reliability and/or the verifiability of an identification feature. For example, a social security number may be associated with one validity rating, because of its verifiability. A driver's license, which typically includes a photograph, may be associated with a higher validity rating than a social security number. A passport may be associated with a still higher validity rating than a driver's license, because of the relative difficulty of counterfeiting it. Biometric information may be associated with a higher validity rating than a document provided by a user, as may information provided by a third party source. In some embodiments, the verification device may increase or decrease the identification feature validity rating based on the number or amount of identification features. In some embodiments, the verification device may increase or decrease the identification feature validity rating based on a degree of reliability and/or verifiability of one or more identification features . . . .

The identification input may further include a source where the identification feature is received. For example, the source of the identification feature may include source device 102. Source device 102 may include a device whose type, location, manufacturer, operator, etc. is known, or whose type, location, manufacturer, operator, etc. is unknown. The source may include a third party source, such as a governmental or private entity. Further, the identification feature may further include a source validity rating, which may include an evaluation of the reliability of the source of the identification feature. For example, a source device that is inspected or verified by an operator of the verification device 106 may be associated with a higher source validity rating than a source device that is not inspected and/or verified. In some embodiments, the verification device may be configured to increase or decrease a value of the source validity rating based on the evaluation of the reliability of the source of the identification feature.

In some embodiments, one or more identification features may be received from another source, and may be stored in a memory associated with the verification device 106. For example, identification features may be provided by a third party source, such as a government or private agency, for example, the Social Security Administration, the Office of Foreign Assets Control (OFAC), a credit agency such as Equifax, Experian, TransUnion, and the like. An identification feature received from another source may be correlated with an identification feature received through the source device 102. Received identification features may be stored in a memory associated with the verification device 106. A third party source may be associated with a source validity rating that is based on the reliability and/or verifiability of the third party source. In some embodiments, the verification device may increase or decrease the base verification score based on a correlation between identification feature received from another source and an identification feature received through, e.g., the source device 102. In some embodiments, the verification device may increase or decrease the base verification score based on the source validity rating.

In block 310, the verification device may generate the glyph based on the base verification score, the at least one identification input, and the selected image. In some embodiments, the verification device may provide the generated glyph to the output device (e.g., the output device 104). The generated glyph may include an image, a symbol, a picture, an icon, a sign, or other image, and may include a machine-readable encoding of the base verification score and the at least one identification input. The glyph may include human-readable information, including letters, numbers, images, and other human-readable symbols and signs. In some embodiments, the verification device may generate the glyph based on a base verification score calculated at the verification device and at least one identification feature received at the source device. In some embodiments, the glyph may include an encoding of the base verification score and the identification input. The encoded glyph may include a machine-readable portion that may be scanned, and from which the base verification score and/or at least one component of the identification input may be extracted. In some embodiments, the glyph may include an encoding of the base verification score, the identification input, and a session verification score generated at the verification device. In some embodiments, the glyph may include an encoding of additional information, such as a unique transaction ID or session ID, system generated identifiers, document information or identifiers, a network address of the source device (e.g., an IP address associated with the source device), a date and/or time stamp of its generation, an indicator of the location from which the glyph is requested (e.g., an address, latitude/longitude coordinates, or another location indicator), a service provider name or logo, or other additional information (including combinations of the foregoing) that may tend to make the information encoded glyph more specific, and thus more readily useful in identifying the specific user.

In some embodiments, the verification device may change, modify, add to, subtract from, or alter in another way the selected image as part of the operations of generating the glyph. In some embodiments, the verification device may encode one or more information items into the received image as part of generating the glyph 112. Incorporating the selected image as part of the glyph 112 may enhance the usability of the glyph by making the glyph more recognizable, in addition to encoding the various information in the glyph. Further, incorporating the selected image as part of the glyph 112 may improve the effectiveness of the glyph 112 as evidence of a user authorization or endorsement of the document 110. For example, in addition to the information encoded into a glyph, a glyph incorporating the logo of a user's favorite sports team may provide greater evidence that the glyph (or its associated document) was authorized, endorsed, or "signed" by such user. On the other hand, a glyph incorporating the logo of a rival sports team may provide greater evidence that such user has not authorized or endorsed the associated document.

In block 312, the output device (or the verification device, the source device, or another suitably configured device) may associate the generated glyph with a document. Associating the glyph with the document may include producing a physical copy of the document showing the glyph. Associating the glyph with the document may include creating an electronic version of the document including the glyph (for example, a PDF format or other electronic document format, in which the glyph is displayed as part of the document). Associating the glyph with the document may include generating a data association between the document and the glyph such that display or transmission of the document necessarily includes display or transmission of the glyph. The association of the glyph and the document may be stored in a memory of a device (e.g., the verification device, the source device, or another suitably configured device). The document may include a physical or electronic document.

Figure 4:
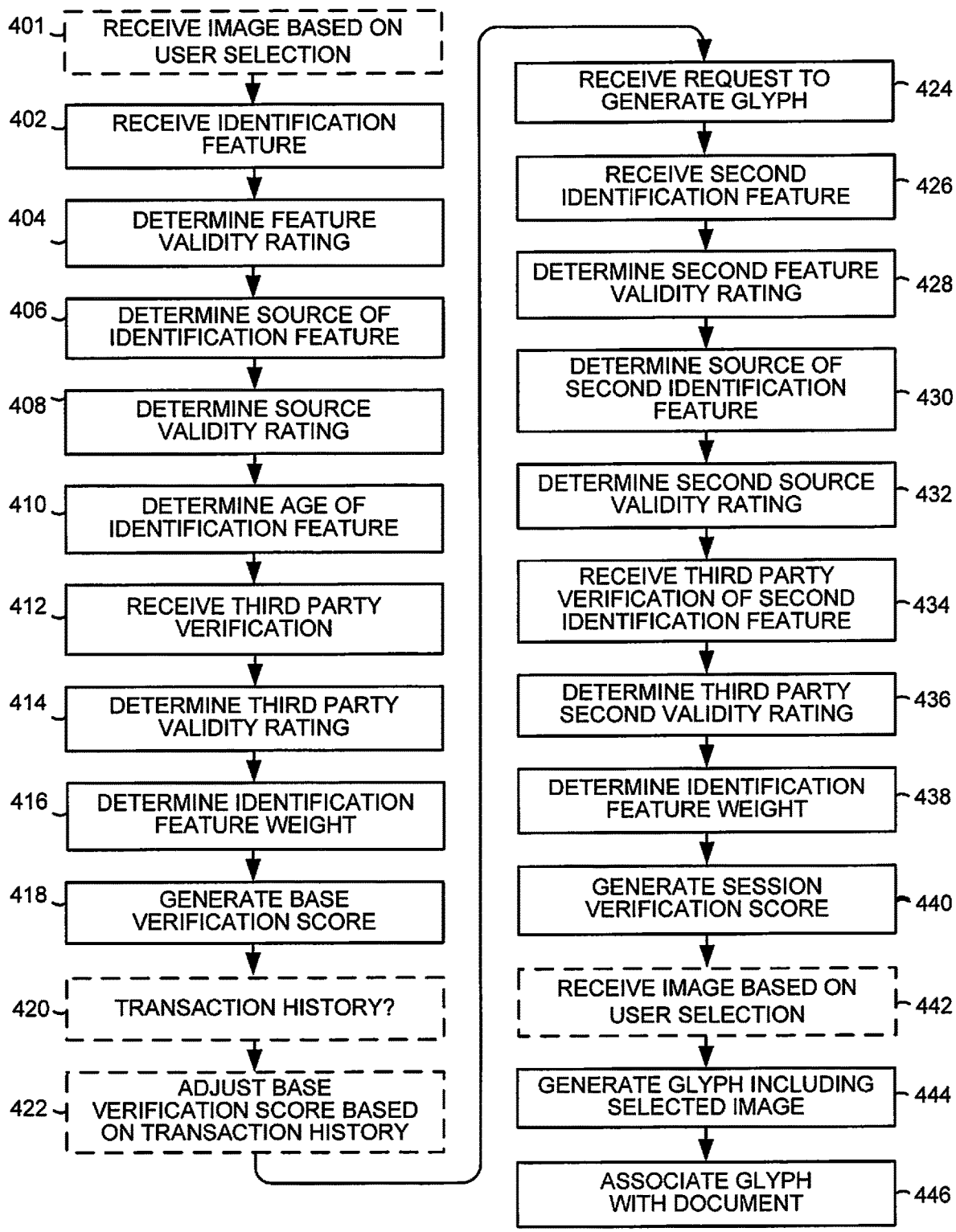
FIG. 4 illustrates a method of managing a document with an authenticated document biosignature according to various embodiments.

FIG. 4 illustrates a method 400 of managing a document with an authenticated document biosignature according to various embodiments. The method 400 may be implemented by a device processor (e.g., the processor 206 in FIG. 2, the processing system in FIG. 9, or another similar processor).

A verification device (e.g., the verification device 106 illustrated in FIG. 1) may generate a base verification score associated with a user, and the verification device may store the user's base verification score for later use in verifying the user's identity, or in generating a glyph that may be associated with a document to authenticate the user.

In block optional 401, a verification device (e.g., the verification device 106) may receive an image based on a user selection. In some embodiments, the verification device may receive the image later in the method 400, as described below. The selected image may, in some embodiments, represent or be associated with a human-recognizable image, for example, a photograph, an icon, a logo, or another such image. In some embodiments, the selected image may represent, for example, a favorite sports team, music group, school, organization, product, company, or another similar image. In some embodiments, the verification device may receive the image based on a user selection that is received at a source device (e.g., the source device 102). In some embodiments, the verification device may receive the image when the image is associated with a user account (e.g., upon creation of the user account, or when the image is later added to an existing user account).

In block 402, a source device (e.g., the source device 102) may receive an identification feature from a user. The identification feature may be associated with a user of source device 102, and may include biometric information including a fingerprint, palm print, voice sample, retinal vein pattern, iris pattern, a venous or arterial pulse, a blood pressure, face recognition, handwriting analysis, signature analysis, and the like, including combinations thereof; demographic information, such as name, address, phone number, citizenship, and other demographic information, including combinations thereof; a document or identification number from a document, such as a driver's license, social security number, a passport, a utility account number (e.g., for a utility such as gas, electricity, telephone service, internet service, etc.), and the like. Received identification feature(s) may be sent to the verification device, and may be stored in a memory associated with the verification device.

In block 404, the verification device may determine a feature validity rating for the received identification feature. The feature validity rating may include an evaluation of the reliability and/or the verifiability of an identification feature. For example, a social security number may be associated with one validity rating, because of its verifiability. A driver's license, which typically includes a photograph, may be associated with a higher validity rating than a social security number. A passport may be associated with a still higher validity rating than a driver's license, due to the difficulty of counterfeiting it. Biometric information may be associated with a higher validity rating than a document provided by a user, as may information provided by a third party source. In some embodiments, the verification device may increase or decrease the feature validity rating based on a degree of reliability and/or verifiability of one or more identification features.

In block 406, the verification device may determine a source of the identification feature. The source may include a source device where the identification feature is received, such as source device 102. In such case, source device 102 may include a device whose type, location, manufacturer, operator, etc. is known, or whose type, location, manufacturer, operator, etc. is unknown. The source may include a third party source, such as a governmental or private entity. For example, the identification features may be provided by a third party source, such as a government or private agency, e.g., the Social Security Agency, the Office of Foreign Assets Control (OFAC), a credit agency such as Equifax, Experian, TransUnion, and the like.

In block 408, the verification device may determine a validity rating for the determined source. The source validity rating may include an evaluation of the reliability of the source of the identification feature. A third party source may be associated with a source validity rating, so that the source validity rating may be based on the reliability and/or verifiability of the third party source. In some embodiments, the verification device may use the source validity rating to determine how much weight to give to the received identification feature(s) based on the source. In some embodiments, the verification device may increase or decrease the source validity rating based on the evaluation of the reliability of the source of the identification feature.

The source validity rating may include a type of source. For example, source device 102 may include a device provided by an operator of verification device 106, such that source device 102 includes a certified or verified source device, which may be associated with a relatively high type of source rating. Source device 102 may further include a device that is provided by a third party and that is inspected or verified by an operator of verification device 106; such a device may be associated with a lower source validity rating than a source device that is provided by the operator of verification device 106. Source device 102 may include a device provided by a third party and that is not inspected and/or verified; such a device may be associated with a still lower type of source rating. In some embodiments, the verification device may increase or decrease the source validity rating based on the evaluation of the type of the source device and/or the provider of the source device.

The source validity rating may include a rating of a location where the identification features is received. For example, one source validity rating may be associated with a source located in a private home, and a higher source validity rating may be associated with a source located at a point of sale in a commercial location, such as a pharmacy. A higher source validity rating may be associated with a source located in a bank, and a still higher source validity rating may be associated with a source located at a doctor's office. Other examples are also possible. Thus, the source validity rating may include an evaluation of the reliability and/or verifiability of the source based on the source's location. In some embodiments, the verification device may increase or decrease the source validity rating based on the reliability and/or verifiability of the source based on the source's location.

In block 410, the verification device may determine an age of the identification feature. For example, where the identification feature is a document, such as a driver's license or a passport, the date of production or issuance of the document may be determined. In some embodiments, the verification device may increase or decrease a weight associated with the identification input or the identification feature based on the determined age of the identification feature. For example, the verification device may decrease a weight associated with the identification input or the identification feature when the age of the identification feature meets a threshold age. Additionally, or alternatively, the verification device may decrease a weight associated with the identification input or the identification feature based on the age of the identification feature, where the older the age of the document, the more the weight is decreased. An older documentary identification may be deemed less reliable than a more recent document. Similarly, current or freshly-received biometric data (e.g., younger than a threshold age), such as a fingerprint, vein pattern, iris pattern, etc., received at source device 102, may be deemed more reliable than non-current biometric data, such as an image of a fingerprint on a driver's license, or a photograph in a passport. In some embodiments, the verification device may increase the weight associated with the identification input or the identification feature when the age of the identification input or identification feature is less than a threshold age.

In block 412, the verification device may receive third party verification for the identification feature. For example, a government agency may provide verification of a document received as an identification feature. As another example, an employer may provide verification of demographic information such as a name, address, phone number, citizenship, and the like. As yet another example, a physician may provide verification of biometric information. Other examples are also possible, including combinations thereof.

In block 414, the verification device may determine a validity rating of the third party. The third party validity rating may include an evaluation of the reliability of the third party providing the third party verification of the received identification feature. For example, a government agency, an employer of the user, and the physician may be evaluated based on reliability and/or verifiability, and each may be associated with a third party validity rating. In some embodiments, the verification device may increase or decrease the validity rating based on the evaluation of the reliability and/or verifiability of the third party.

In block 416, the verification device may determine an identification feature weight, which may include a weight to be given to a particular identification feature. The identification feature weight may be based on at least one of the feature validity rating, the source where the feature is received, the source validity rating, the third party verification of the identification feature, and the third party validity rating. Where two or more identification features are received, each identification feature may be associated with an identification feature weight.

In block 418, the verification device may, generate (or calculate) a base verification score using the identification feature and the identification feature weight. The base verification score may be stored, for example, in a memory associated with the verification device 106. The base verification score may be associated with the user that provided the identification feature, and may be stored at the verification device for later use in verifying the identity of the user.

In optional block 420, the verification device may determine whether any transaction history is stored. The generated base verification score may be adjusted over time (e.g., by the verification device). For example, after a base verification score is generated, a new identification feature may be received, for example, at a source device, from a third party, and the like. The verification device may determine a feature validity rating, a source of the new identification feature, a source validity rating, an age of the identification feature, and/or a third party verification and an associated third party validity rating for the new verification feature.

Additionally, or alternatively, the base verification score may be used when a request to access a service is received, which may include a service for which access control by verification of an authentication may be required. Examples of a service that access control by verification of an authentication may be required may include a banking service, a medical service, access to a location, a transactional service, a document preparation service, or another such service. Whether access to the service is granted or not may be stored, for example, in a memory associated with the verification device 106. Such a history may generally be described as a transaction history, and may include one or more requests to access a service, an indication of the base verification score associated with the requester at the time the request is received, and an indication of whether access is granted to the service, among other things.

In optional block 422, based on the transaction history, if any, the verification device may adjust the base verification score to be higher or lower. For example, the verification device may decrease the base verification score based on a denial of access to a requested service. As another example, the verification device may increase of the base verification score based on a granting of access (e.g., a successful authorization) to a requested service.

In some embodiments, a base verification score may be generated for a user when an account or other record is created for the user. For example, an account may be created for the user by an operator of verification device 106, or by the user during an initial authentication attempt, for example, when requesting to access a service. In some embodiments, at least one identification feature may be required to create an account, which may be used to prevent a duplicate account or record from being created.

In block 424, subsequent to the generation and/or adjustment of the base verification score, the verification device may receive a request to generate a glyph. The request to generate the glyph may be received, for example, from a source device (e.g., the source device 102), an output device (e.g., the output device 104), a scan device (e.g., the scan device 122), or another similar device. For example, the source device may receive an identification feature and a request to generate a glyph, and the source device may transmit both the identification feature and the request to generate the glyph to the verification device. As another example, the request to generate the glyph may be received at the output device when a document is generated, such as when a document is printed, or when an electronic version of a document (e.g., a PDF document, an email, or a similar document) is generated.

In block 426, the source device may receive a second identification feature. In some embodiments, the second identification feature may be received with the request to generate the glyph. The second identification feature may include biometric information, demographic information, a document or identification number from a document, and the like. The source device may transmit the received identification feature to the verification device, and the verification device may store the received identification feature in a memory, for example, associated with the verification device.

In block 428, the verification device may determine a second feature validity rating for the received second identification feature. The second validity rating may include an evaluation of the reliability and/or the verifiability of an identification feature. For example, a social security number may be associated with one validity rating, because of its verifiability. As another example, a driver's license, which typically includes a photograph, may be associated with a higher validity rating than a social security number. As another example, a passport may be associated with a still higher validity rating than a driver's license. As yet another example, biometric information may be associated with a higher validity rating than a document provided by a user, as may information provided by a third party source.

In block 430, the verification device may determine a second source of the second identification feature. The second source may include a source device where the identification feature is received, such as source device 102. In such case, source device 102 may include a device whose type, location, manufacturer, operator, etc. is known or unknown. The source may include a third party source, such as a governmental or private entity.

In block 432, the verification device may determine a validity rating for the determined second source. The second source validity rating may include an evaluation of the reliability of the source of the identification feature. In some embodiments, the source validity rating may be used to determine how much weight to give to the source of the received identification features.

The source validity rating may include a type of source. For example, source device 102 may include a device provided by an operator of verification device 106, such that source device 102 includes a certified or verified source device, which may be associated with a relatively high type of source rating. Source device 102 may further include a device that is provided by a third party and that is inspected or verified by an operator of verification device 106, and such a device may be associated with a lower source validity rating than a source device that is provided by the operator of verification device 106. Source device 102 may include a device provided by a third party and that is not inspected and/or verified, and such a device may be associated with a still lower type of source rating.

The source validity rating may include a rating of a location where the identification features is received. For example, one source validity rating may be associated with a source located in a private home, and a higher source validity rating may be associated with a source located at a commercial point of sale, such as a pharmacy. A higher source validity rating may be associated with a source located in a bank, and a still higher source validity rating may be associated with a source located at a doctor's office. Thus, the source validity rating may include an evaluation of the reliability and/or verifiability of the source based on the source's location.

In block 434, the verification device may receive a third party verification for the identification feature. For example, a government agency may provide verification of a document received as an identification feature. As another example, an employer may provide verification of demographic information such as name, address, phone number, citizenship, and the like. As yet another example, a physician may provide verification of biometric information. Other examples are also possible, including combinations thereof. The verification device may determine a second validity rating of the third party (in block 536). The third party second validity rating may include an evaluation of the reliability of the third party providing the third party verification of the received identification feature, and each of the government agency, the employer, and the physician may be evaluated based on reliability and/or verifiability, and may be associated with a third party validity rating.

In block 438, verification device may determine a second identification feature weight, which may include a weight to be placed on the second identification feature. The second identification feature weight may be based on at least one of the second feature validity rating, the second source where the second feature is received, the second source validity rating, the third party second verification of the identification feature, and the third party second validity rating. When two or more second identification features are received, each identification feature may be associated with an identification feature weight.

In block 440, the verification device may generate (e.g., calculate) a session verification score using the base verification score, the second identification feature, and the second identification feature weight. The session verification score may be stored, for example, in a memory associated with the verification device.

In optional block 442, the verification device may receive an image based on a user selection. As described above, the selected image may, in some embodiments, represent or be associated with a human-recognizable image, for example, a photograph, an icon, a logo, or another such image. The image received in optional block 442 may be in addition to, or alternative to, the image that may be received in optional block 401. For example, a user may select an image to be used for a specific document to distinguish such document from other documents, for which a different image may be used.

In block 444, the verification device may generate the glyph including the selected image. In some embodiments, the verification device may provide the generated glyph to the output device. In some embodiments, the verification device may generate the glyph the based on the base verification score, the at least one identification input, and the selected image. The generated glyph may include an image, a symbol, a picture, an icon, a sign, or other image, and may include a machine-readable encoding of the base verification score and the at least one identification input. The glyph may include human-readable information, including letters, numbers, images, and other human-readable symbols and signs. In some embodiments, verification device may generate the glyph based on the base verification score, the session verification score, and at least one identification feature received at the source device. In some embodiments, the glyph may include an encoding of the base verification score, the at least one identification input, and a session verification score generated at the verification device. The encoded glyph may include a machine-readable portion that may be scanned, and from which the base verification score, the session verification score, and/or the at least one identification input may be extracted. In some embodiments, the glyph may include an encoding of additional information, such as a unique transaction ID or session ID, system generated identifiers, document information or identifiers, a network address of the source device (e.g., an IP address associated with the source device), a date and/or time stamp of its generation, an indicator of the location from which the glyph is requested (e.g., an address, latitude/longitude coordinates, or another location indicator), a service provider name or logo, or other additional information (including combinations of the foregoing) that may tend to make the information encoded glyph more specific, and thus more readily useful in identifying the specific user.

In some embodiments, the verification device may change, modify, add to, subtract from, or alter in another way the selected image as part of the operations of generating the glyph. In some embodiments, the verification device may encode one or more information items into the received image as part of generating the glyph. Incorporating the selected image as part of the glyph may enhance the usability of the glyph by making the glyph more recognizable, in addition to encoding the various information in the glyph. Further, incorporating the selected image as part of the glyph may improve the effectiveness of the glyph as evidence of a user authorization or endorsement of the document. For example, in addition to the information encoded into a glyph, a glyph incorporating the logo of a user's favorite sports team may provide greater evidence that associated with the glyph was "signed" by such user, whereas a glyph incorporating the logo of a rival sports team may provide greater evidence that such user has not authorized or endorsed the associated document.

In block 446, the output device (or the verification device, or another suitably configured device) may associate the generated glyph with a document. Associating the glyph with the document may include producing a physical copy of the document showing the glyph. Associating the glyph with the document may include creating an electronic version of the document including the glyph (for example, a PDF format or other electronic document format, in which the glyph is displayed as part of the document). Associating the glyph with the document may include generating a data association between the document and the glyph such that display or transmission of the document necessarily includes display or transmission of the glyph. The association of the glyph and the document may be stored in a memory of a device (e.g., the verification device, the source device, or another suitably configured device). The document may include a physical or electronic document.

FIGS. 5A-5E illustrate example glyphs 500a-500e that may be generated by a device processor (e.g., the processor 206 in FIG. 2, the processing system in FIG. 9, or another similar processor) according to some embodiments.

Figure 5A:
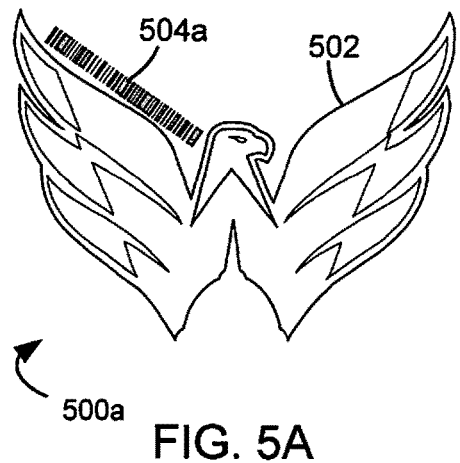
FIGS. 5A-5E illustrate example glyphs according to various embodiments.
Figure 5B:
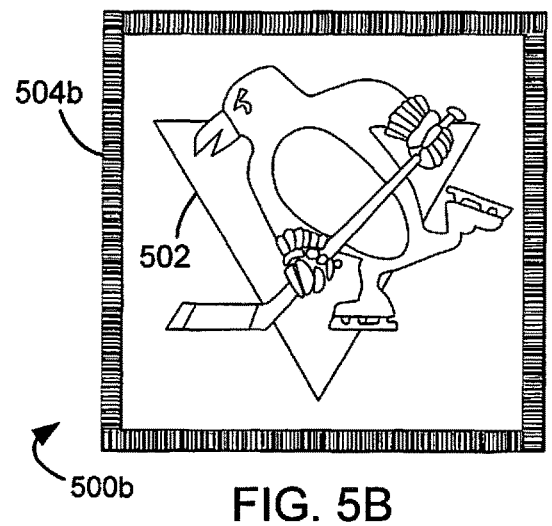
Figure 5C:
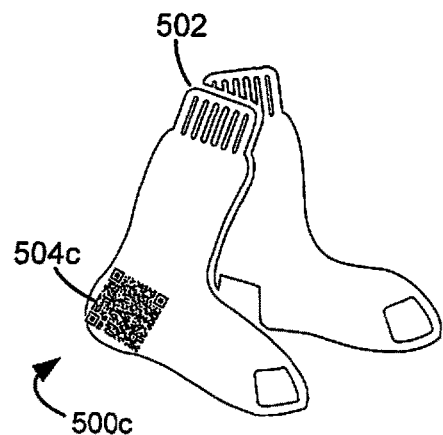
Figure 5D:
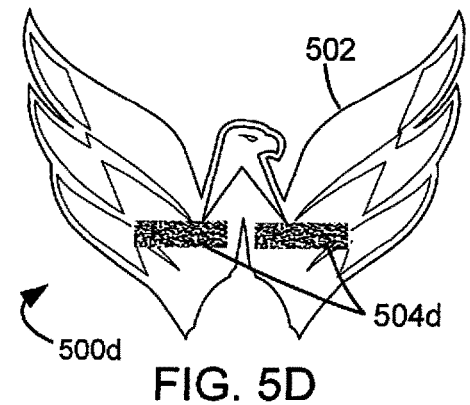
Figure 5E:
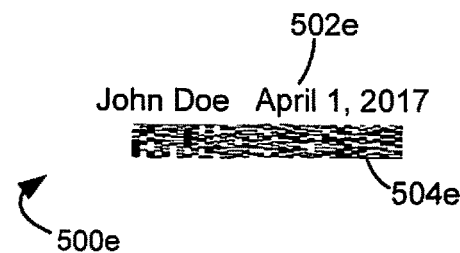

As described above, the glyph 500a-500e may include an image, a symbol, a picture, an icon, a sign, or other image. In various embodiments, the image may be a human-recognizable image. For example, the glyphs 500a-500d include a sports team logo 502. The glyph 500a-500e may include a machine-readable encoding of information, such as the base verification score and the at least one identification input. The device processor may generate the glyph to include the machine-readable encoding in a variety of configurations. For example, FIG. 5A illustrates a glyph 500a that includes a machine-readable encoding 504a that is positioned along an edge of the image 502. FIG. 5B illustrates a glyph 500b that includes a machine-readable encoding 504b that substantially encloses the image 502. FIG. 5C illustrates a glyph 500c that includes a machine-readable encoding 504c that partially overlaps the image 502. FIG. 5D illustrates a glyph 500d that includes a machine-readable encoding 504d that completely overlaps the image 502. In some embodiments, the machine-readable encoding may include two or more portions (e.g., the machine-readable encoding 504d, etc.). In some embodiments, the glyph may include human-readable information, including letters, numbers, images, and other human-readable symbols and signs. For example, the glyph 500e includes human-readable text 502e.

In some embodiments, device processor may generate the glyph 500a-500e based on the base verification score, the session verification score, and at least one identification feature received at the source device. In some embodiments, the machine-readable encoding 504a-504e may include an encoding of the base verification score, the at least one identification input, and a session verification score generated by the device processor (e.g., at a verification device, such as the verification device 106). The machine-readable encoding 504a-504e may be scanned or otherwise analyzed by a device processor, and the base verification score, the session verification score, and/or the at least one identification input may be extracted from the machine-readable encoding.

In some embodiments, the machine-readable encoding 504a-504e may include an encoding of additional information, such as a unique transaction ID or session ID, system generated identifiers, document information or identifiers, a network address of the source device (e.g., an IP address associated with the source device), a date and/or time stamp of its generation, an indicator of the location from which the glyph is requested (e.g., an address, latitude/longitude coordinates, or another location indicator), a service provider name or logo, or other additional information (including combinations of the foregoing) that may tend to make the information encoded glyph more specific, and thus more readily useful in identifying the specific user associated with the generated glyph.

As illustrated in the glyphs 500a-500e, in some embodiments, the device processor may change, modify, add to, subtract from, or alter in another way the selected image as part of the operations of generating the glyph. In some embodiments, the device processor may encode one or more information items into the selected image as part of generating the glyph. Incorporating the selected image and/or text as part of the glyph may enhance the usability of the glyph by making the glyph more recognizable, in addition to encoding the various information in the glyph. Further, incorporating the selected image as part of the glyph may improve the effectiveness of the glyph as evidence of a user authorization or endorsement of the document. For example, in addition to the information encoded into a glyph, a glyph incorporating the logo of a user's favorite sports team, or other information such as user's name, the date on which a document was endorsed, and the like, may provide greater evidence that associated with the glyph was "signed" by the user. As another example, a glyph incorporating the logo of a rival sports team (for example, which the user is known to dislike) may provide greater evidence that the user has not authorized or endorsed the associated document.

Figure 6:
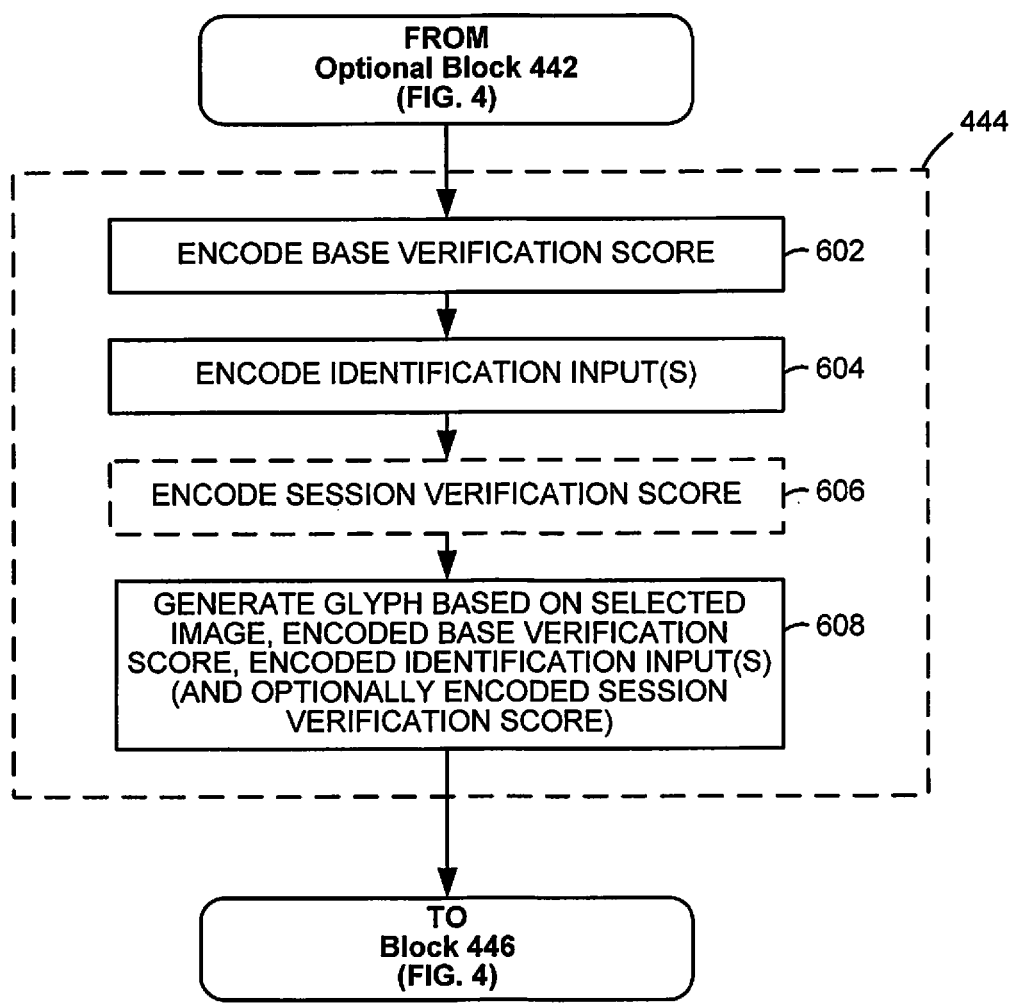
FIG. 6 illustrates a method of managing a document with an authenticated document biosignature according to various embodiments.

FIG. 6 illustrates a method 600 of managing a document with an authenticated document biosignature according to various embodiments. The method 600 illustrates operations that may be performed in block 442 of FIG. 4. The method 600 may be implemented by a device processor (e.g., the processor 206 in FIG. 2, the processing system in FIG. 9, or another similar processor).

In block 602, the device processor may encode the base verification score. In some embodiments, the device processor may encode the base verification score in a machine-readable encoding (e.g., the machine-readable encodings 504a-504e).

In block 604, the device processor may encode the one or more identification inputs. In some embodiments, the device processor may encode the one or more identification inputs in the machine-readable encoding. In some embodiments, the device processor may encode the one or more identification inputs as a separate and/or distinct machine-readable encoding (e.g., the machine-readable encoding 504d).

In some embodiments, the identification input(s) may include at least one identification feature. In some embodiments, the identification input(s) may include a feature validity rating of one or more identification features. In some embodiments, the identification input(s) may include a source where the one or more identification features are received. In some embodiments, the identification input(s) may include a source validity rating of the source. In some embodiments, the identification input(s) may include, at least one of the identification input(s) may include a biometric identification feature.

In optional block 606, the device processor may encode the session verification score. In some embodiments, the device processor may encode the session verification score in the machine-readable encoding. or as a separate and/or distinct machine-readable encoding (e.g., the machine-readable encoding 504*d*).

In block 608, the device processor may generate the glyph based on the selected image, encoded base verification score, and the encoded one or more identification inputs. In some embodiments, the device processor may generate the glyph based on the selected image, encoded base verification score, the encoded one or more identification, and the encoded session verification score.

Figure 7:
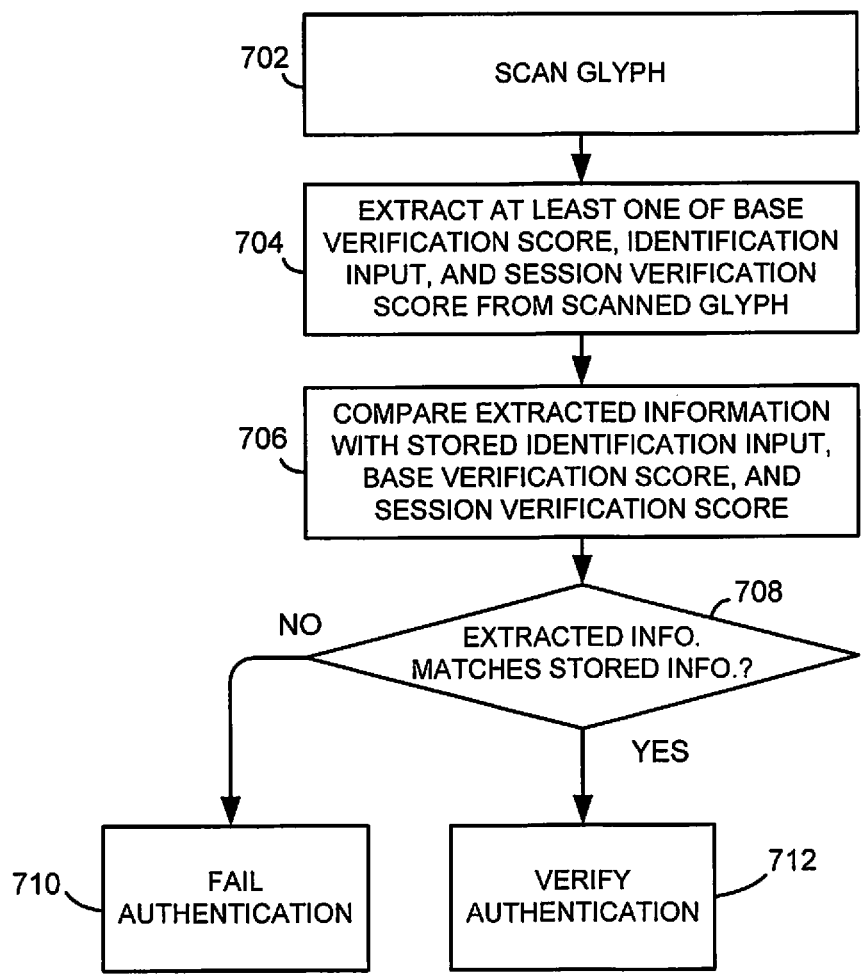
FIG. 7 illustrates a method of managing a document with an authenticated document biosignature according to various embodiments.

FIG. 7 illustrates a method 700 of managing a document with an authenticated document biosignature according to various embodiments. The method 700 may be implemented by a device processor (e.g., the processor 206 in FIG. 2, the processing system in FIG. 9, or another similar processor).

In block 702, a scan device (e.g., the scan device 122) may scan a glyph associated with a document. For example, a document (e.g., the document 110) associated with a glyph (e.g., the glyph 112, 500*a*-500*e*) may be presented, and the scan device may be used to scan the glyph associated with the document to verify the identity of the user associated with the glyph.

In block 704, the scan device may extract least one of a base verification score, a session verification score, and/or a component of an identification input from the scanned glyph. The scan device may transmit the extracted base verification score, session verification score, and/or identification input component (e.g., a verification feature) to a verification device (e.g., the verification device 106).

In block 706, the verification device may compare the extracted base verification score, session verification score, and/or identification input component to a stored base verification score, session verification score, and/or identification input component that has been stored at the verification device (e.g., in a memory associated with the verification device).

In determination block 708, the verification device may determine whether the extracted information matches the stored information. For example, the verification device may determine whether the extracted base verification score, session verification score, and/or identification input component matches stored base verification score, session verification score, and/or identification input. In some embodiments, the verification device may determine a first value using the extracted base verification score, session verification score and/or identification input, such as a hash value, a vector value, or some other value that may be calculated using all of the extracted information. In some embodiments, the verification device may determine the second value using the stored base verification score, session verification score, and/or identification input, and may compare the first value to the second value to determine whether the extracted information matches the stored information. In some embodiments, the verification device may separately compare the extracted and stored base verification scores, session verification scores and or identification input to determine whether any of the information matches. The determination of whether the extracted information matches the stored information may require an exact match, or it may require a match within a threshold level of matching (e.g., a percentage of matching).

In response to determining that the extracted information does not match the stored information (i.e., determination block 708="NO"), (e.g., in response to determining that the verification device determines that the matching is insufficient), the verification device may return an authentication fail, and the verification device may not verify the identity of the user associated with the glyph in block 710. In some embodiments, when the verification device determines an authentication failure, the verification device may send a message to the scan device indicating the authentication failure.

In response to determining that the extracted information matches the stored information (i.e., determination block 708="YES"), the verification device may return a verification of the authentication of the glyph in block 716. In some embodiments, the verification device may send a message to the scan device indicating the authentication verification/success.

Figure 8:
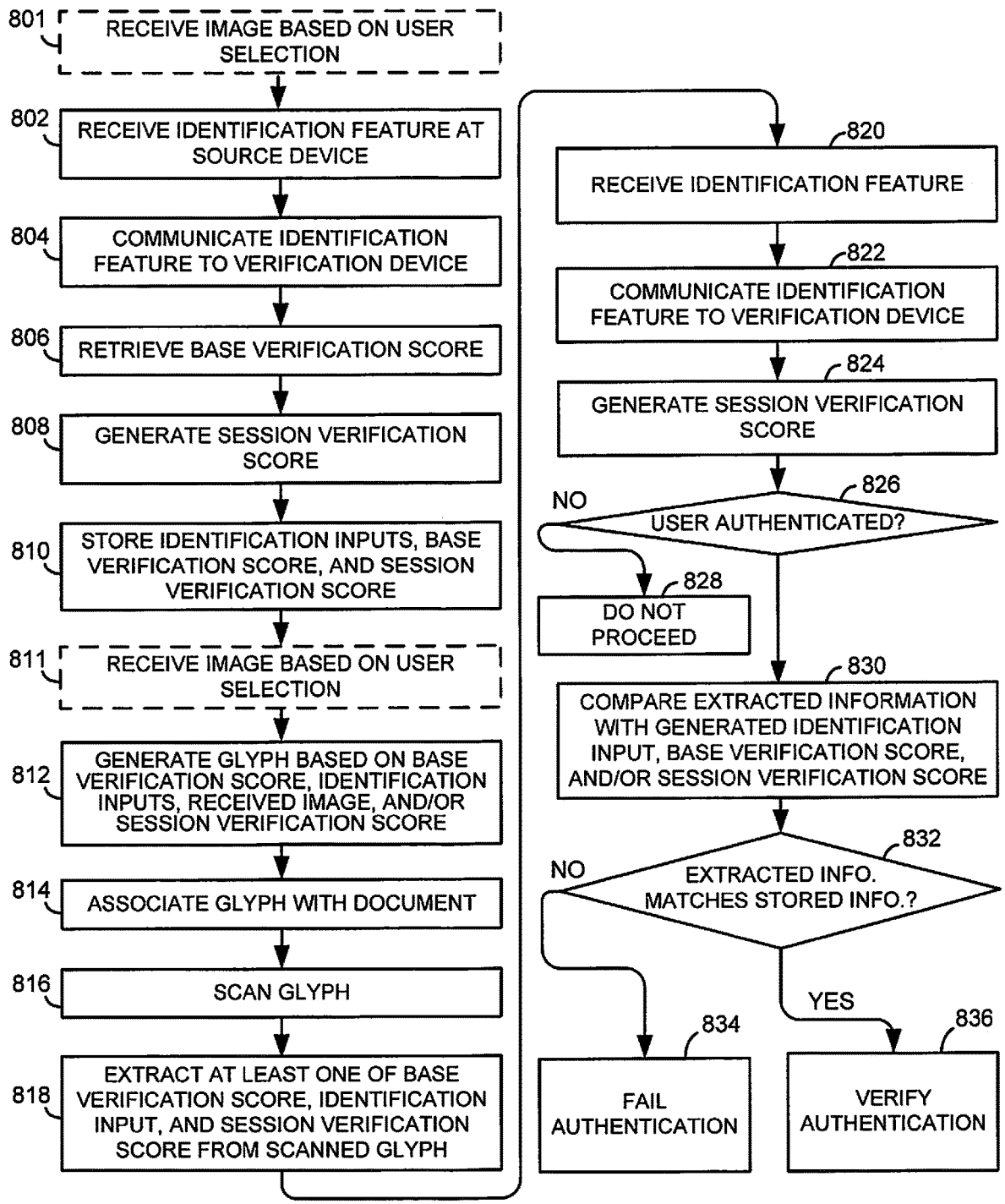
FIG. 8 illustrates a method of managing a document with an authenticated document biosignature according to various embodiments.

FIG. 8 illustrates another exemplary method 800 of verifying an authenticated document biosignature according to various embodiments. The method 800 may be implemented by a device processor (e.g., the processor 206 in FIG. 2, the processing system in FIG. 9, or another similar processor).

In some embodiments, a user may present a document including an associated glyph for authentication. In such embodiments, an identity of the user may be verified, for example, based on previously-generated information such as a base verification score, one or more identification inputs, and/or a session verification score. Further, if the identity of the user is verified, an authenticity of the glyph may also be determined to authenticate the associated document.

In optional block 801, a verification device (e.g., the verification device 106) may receive an image based on a user selection. The selected image may, in some embodiments, represent or be associated with a human-recognizable image, for example, a photograph, an icon, a logo, or another such image. In some embodiments, the selected image may represent, for example, a favorite sports team, music group, school, organization, product, company, or another similar image. In some embodiments, the verification device may receive the image based on a user selection that is received at a source device (e.g., the source device 102). In some embodiments, the verification device may receive the image when the image is associated with a user account (e.g., upon creation of the user account, or when the image is later added to an existing user account).

In block 802, a source device may receive one or more identification features from a user. The identification feature(s) may be associated with a user of a source device (such as source device 102), and may include biometric information including a fingerprint, palm print, voice sample, retinal vein pattern, iris pattern, a venous or arterial pulse, a blood pressure, face recognition, handwriting analysis, signature analysis, and the like, including combinations thereof; demographic information, such as name, address, phone number, citizenship, and other demographic information, including combinations thereof; a document or identification number from a document, such as a driver's license, social security number, a passport, a utility account number (e.g., for a utility such as gas, electricity, telephone service, internet service, etc.), and the like. In block 604, the source device may communicate the received identification feature to the verification device. The received identification feature or features may be stored in a memory associated with the verification device.

In block 806, the verification device may retrieve a base verification score that is associated with the user. The base verification score may have been previously calculated by the verification device and stored in memory (e.g., as described above with respect to block 308 (FIG. 3) and block 418 (FIG. 4)).

In block 808, the verification device may generate a session verification score. The session verification score may be generated based on identification inputs that may include the received identification feature and one or more of a source of the identification feature, a source validity rating, an age of the identification feature, a third party verification of the identification feature, a third party validity rating, and/or an identification feature weight.

In block 810, the verification device may store in a memory the base verification score, the session verification score, and the identification inputs.

In block optional 811, a verification device (e.g., the verification device 106) may receive an image based on a user selection. As described above, the selected image may, in some embodiments, represent or be associated with a human-recognizable image, for example, a photograph, an icon, a logo, or another such image. The image received in optional block 811 may be in addition to, or alternative to, the image that may be received in optional block 801. For example, a user may select an image to be used for a specific document to distinguish such document from other documents, for which a different image may be used.

In block 812, the verification device may generate a glyph (e.g., the glyphs 500a-500e) based on the base verification score, the session verification score, the received image, and/or the identification input(s). The verification device may generate the glyph in response to a request to generate the glyph, which the verification device may receive from a source device (e.g., source device 102) or an output device (e.g., output device 104), or from another device. For example, the source device may receive the identification feature and a request to generate a glyph, and the source device may transmit both the identification feature and the request to generate the glyph to the verification device. As another example, the request to generate the glyph may be received at the output device when a document is generated, such as when a document is printed, or when an electronic version of a document (e.g., a PDF document, an email, or a similar document) is generated. In some embodiments, the verification device may change, modify, add to, subtract from, or alter in another way the selected image as part of the operations of generating the glyph. In some embodiments, the verification device may encode one or more information items into the received image as part of generating the glyph. Incorporating the selected image as part of the glyph may enhance the usability of the glyph by making the glyph more recognizable, in addition to encoding the various information in the glyph.

In block 814, the output device (or the source device, verification device, or another suitably configured device) may associate the generated glyph with a document.

In block 816, a scan device may later scan the glyph associated with the document. For example, the document associated with the glyph may be presented, and the scan device may be used to scan the glyph associated with the document to verify the identity of the user associated with the glyph.

In block 818, the scan device may extract least one of the base verification score, the session verification score, and/or the identification input from the scanned glyph. The scan device may transmit the extracted base verification score, session verification score, and/or identification input to the verification device.

In block 820, when the scan device scans the glyph, the scan device may receive one or more identification features. For example, in addition to presenting the document to scan the glyph, a user may input one or more identification features, which may be received at the scan device (or by a combination scan device/source device, or by another suitably configured device). The additional identification feature(s) may be used to verify the identity of the user presenting the document.

In block 822, the scan unit may communicate the identification input to the verification device.

In block 824, the verification device may generate (e.g., calculate) a session verification score for the user presenting the document. In some embodiments, the verification device may generate the session verification score using the base verification score, and the second identification feature.

In block 826, the verification device may determine whether the user is authenticated. In some embodiments, the verification device may determine whether the user is authenticated based on the generated session verification score and one or more of the stored base verification score and the stored session verification score (e.g., block 810). In some embodiments, the verification device may determine whether the generated session verification score meets (e.g., is greater than or equal to) the stored base verification score and/or the stored session verification score.

In response to determining that the user is not authenticated (i.e., determination block 826="NO"), the verification device (or the scan device, or another similar device) may not permit further verification or authentication operations in block 828 ("DO NOT PROCEED").

In response to determining that the user is authenticated (i.e., determination block 826="YES"), the verification device may compare the extracted base verification score, session verification score, and/or identification input to a stored base verification score, session verification score, and/or identification input that has been stored at the verification device (e.g., in a memory associated with the verification device), and with the session verification score generated for the user presenting the document in block 830.

In determination block 832, the verification device may determine whether the extracted information matches the stored information and the session verification score generated for the user presenting the document. For example, the verification device may determine whether the extracted base verification score, session verification score, and/or identification input is a sufficient match the stored base verification score, session verification score, and/or identification input. The verification device may further determine whether the session verification score generated for the user presenting the document is a sufficient match to any of the extracted base verification score, session verification score, and/or identification input, as well as the stored base verification score, session verification score, and/or identification input.

In some embodiments, the verification device may determine a first value using the extracted base verification score, session verification score and/or identification input, such as a hash value, a vector value, or some other value that may be calculated using the extracted information. In some embodiments, the verification device may determine a second value using the stored base verification score, session verification score, and/or identification input. The verification device may compare the first value to the second value to determine whether the extracted information matches the stored information. In some embodiments, the verification device may separately compare one or more of the extracted and stored base verification scores, session verification scores and/or identification input to determine whether any of the information matches. The determination of whether the extracted information matches the stored information may require an exact match, or it may require a match within a threshold level of matching (e.g., a percentage of matching).

In response to determining that the extracted information does not match the stored information (i.e., determination block 832="NO"), (e.g., in response to determining that the verification device determines that the matching is insufficient), the verification device may return an authentication fail, and the verification device may not verify the identity of the user associated with the glyph in 833. In some embodiments, when the verification device determines an authentication failure, the verification device may send a message to the scan device indicating the authentication failure.

In response to determining that the extracted information matches the stored information (i.e., determination block 832="YES"), the verification device may return a verification of the authentication of the glyph in block 836. In some embodiments, the verification device may send a message to the scan device indicating the authentication verification/success.

Some embodiments may be applicable in an online self-service use case. Users seeking to obtain goods or services online may expect immediate service at their convenience. Steps that introduce any delay may cause a user to abandon a purchase or registration process, resulting in a loss of a customer. One example is a process that begins electronically but falls back to paper for signatures, which in turn causes delays. If delays stall the process, the customer may abandon the process and shop around for a better deal or faster turnaround from a competitor.

Online Self-Serve Scenario

In an example, a user may visit a website for an auto insurance company and may begin an insurance application process (e.g., by clicking on an "apply now" button or link). This may be known as an online self-serve channel, in which a customer interacts with the provider on their own, from any location they choose, in an "unmediated" manner, since no company representative is involved to mediate or guide the transaction. Common examples of an unmediated self-serve channel include auto load, auto insurance applications and online mortgage origination.

The self-serve channel may use an e-signature solution to keep the transaction paperless from start to finish, to reduce steps in a sign-up process, a registration process, or another transaction to a fraction of what it may be on paper—which may consequently reduce abandonment rates. As an example, an auto insurance company, which may experience a 30-day average cycle to close new policies, may reduce the average cycle time to approximately 15 minutes with an implementation of an e-signature process. However, the company may determine that the validity of the an e-signature may not be evaluated without validating the presence of the customer for each signature.

In an access step, a service provider may implement a system in which a user may access an e-signing session that verifies the user's signature. In some embodiments, a user may receive an email invitation including a link to an e-signature login page, to provide an easy and intuitive way to start the process for the user. The fact that the user has accessed the transaction using a unique email account (which may become part of an electronic transaction record) may be used to help establish authentication. However, because the email itself may have been compromised (e.g., intercepted or hacked), a link provided to a user may direct the user (i.e., a web browser or other software) to a secure site to execute the transaction, which may include signing and downloading documents.

In an authentication step, when the user arrives at the destination site (e.g., an e-signature welcome page) to begin the transaction, the system may screen the user's identity as a prerequisite to entering the e-signing session.

When the user is an existing customer (i.e., already has an account, or has previously conducted a transaction with the service provider) the user may use credentials provided by the service provider. For example, a bank may have provided an online banking customer with a username and password, or challenge/response questions based on personal identification information (e.g., What are the last few digits of your SSN? What is your zip code? Where were you born?). When the user does not have a pre-existing relationship with the service provider, a new account or record may be created for the user, and may be verified using a third-party database such as Experian® or Equifax® as part of the authentication process. The user may be prompted to provide identification information that may be used to generate a base verification score, which may include her biometric data depending on an available source device. When the user' biometric data is received, a base (and/or verification) score may be generated for the current session.

Next, in a document presentation step, documents may be generated for review and verification by a user. For example, web-based digital documents may be presented, for example, through a web browser or similar software. The system may provide the user with an additional option to print hard copies to review documents on paper.

Next, in a signature step, the user may be presented with a signature prompt, such as "click to sign". The user may be prompted to biometrically identify himself at the source device to confirm his presence and identity. When the biometric data provided by the user is validated, a biosignature glyph may generated based on, for example, the source device IP address, document name(s), geographic location, and other parameters. A unique identifier such as a transaction ID or another unique ID may be associated with the glyph. The glyph may then be associated with the document(s), e.g., embedded into the document once the customer clicks an acceptance button (e.g., "ACCEPT" or "CONTINUE".) This sequence of actions may reinforce the conspicuous capture of intent, all of which may be included in the generated document's audit trail as proof that a sound process was used to build the user's understanding of what they were agreeing to and signing.

Then, in a document delivery step, when the generated glyph has been associated with the document(s), an electronic copy may be securely delivered, either electronically or through a physical document delivery.

In-Person Retail Transaction Scenario

A retail banking transaction, such as a purchase financing (e.g., for an automobile), new account openings, and loan applications are some of the most common examples of "mediated" use cases. While such transactions are often processed straight-through, even when automated, processes often still require the intervention of a knowledge worker to advise, guide and provide a personalized experience.

A bank may employ a system for generating an authenticated document biosignature in a mediated scenario, for example, using a portable computing device, such as a tablet. Back-office operations may thus have full visibility into the status of every transaction in progress across the country. By electronically enforcing workflow rules, errors such as missing signatures may be mitigated or eliminated. Further, the process may prevent the submission of a document for processing until it has been completed correctly.

In an access step, for example, at a retail point-of-sale (POS) process, an electronic transaction may be performed place on the company's equipment and devices, which may include laptops, desktop stations, kiosks or tablet computers, which may function as source devices. Since a customer and a company the representative may meet in person, the representative may initiate an e-signing process on the customer's behalf, e.g., through an enterprise application portal or dashboard.

Next, in an authentication step, the company representative may verify the customer's identity during their face-to-face meeting, using a driver's license or other photo ID. Thus far, authentication is substantially similar to a paper transaction. However, information collected may be used in generation of an identity score (e.g., a base verification score or a session verification score).

When a base (or session) verification score satisfies an organization threshold and biometric data for the individual has not been previously obtained for the user, the user (i.e., the customer) may register his/her biometric data depending on the device available (i.e., a source device). Once biometric data is received, a base verification score may be generated for the user. When a base verification score has already been generated for the user, a session verification score for the current session may be generated.

Next, in a document presentation step, documents may be generated and presented to the user for review prior to signing. This doesn't necessarily mean that the company representative has to share their computer screen with the customer in order to keep the process electronic. In a point-of-sale environment, it is often not practical to offer screen-based review of documents and disclosures for a variety of reasons. For example, confidential information may be visible on the representative's monitor, or the ergonomics of having a customer sit in an agent's chair behind their desk may be awkward. Thus, in this scenario, a printed paper version of a document may be made available to the user for review, and once the user has read the documents and indicated an approval, the representative and customer may return to the electronic signing session. Next, in a signing step, the user (i.e., customer) may biometrically identify himself at the source device to confirm his presence and identity, using an appropriately configured source device. When biometric data provided by the user is validated, a biosignature glyph may be generated based on, for example, source device information such as a device identifier, a source device IP address, a document name, geolocation informaiton, and various other parameters which may be assigned a unique id. The glyph is generated and embedded into the document once the customer indicates acceptance into the source device (or other device) by, for example, clicking an "ACCEPT" or "CONTINUE" button.

Next, in a delivery step, a physical copy (such as a paper copy) of the document and the associated glyph may be presented to the user, or delivered by secure physical delivery or electronic means.

In-Field Document Signature Scenario

A user (e.g., a customer) may meet with an insurance agent or representative in-person in a field location. Examples of transactions that may fall into this category are processes such as life insurance new business (including paramedical exams) and wealth management/investment. In an access step, during an in-person meeting, signers (i.e., users) may meet in person, and a company representative may initiate an e-signing process on the customer's behalf, e.g., by clicking on a link in a portal application on a mobile wireless device, or, e.g., in the case of a life insurance agent, an agency management system. For example, the transaction, including the authentication and verification process, may be performed on a tablet computer or a laptop which are configured to obtain biometric information, and as such may function as a source device.

Next, in an authentication step, information, e.g., from a government issued identify document, may be obtained, as well as various biometric inputs from the user. The identification and biometric information collected may be used to generate a base and/or session verification score. When the base and/or session verification score(s) satisfies an organization threshold and biometric data for the individual has not been previously obtained, the user may register his/her biometric data depending on the device available. Once biometric data is established, the base and/or session verification score may be generated for the current session.

Next, in a document presentation step, the user is provided documents to read and review before signing. Combining e-signing with, e.g., web-enabled tablets, may allow for a convenient method of presenting documents to clients during face-to-face interactions with agents. Source devices like a handheld tablet may facilitate the document review and signing process with their large screen areas and scrolling/zooming feature. Next, in a document obtaining step, additional documents may be input into the system as needed. For example, an insurance carrier's independent field agents may have their own documents to add to a new business application process. These documents may be non-standard legal documents supplied by the customer, such as a power of attorney form or medical report documents that are not included in a typical application forms package. Once the agent has received the document from the customer, the documents may be input, e.g, as a scanned version to the e-signature system or as a fax that is automatically converted to PDF, and inserted it into the transaction by the system.

Next, in a signature step, the user may biometrically identify himself at the source device to confirm his presence and identity. Once the biometric data provided by the customer is validated, a bio-signature glyph may be generated based on source device information, such as a device identifier, a source device IP address, a document name, geolocation information, and various other parameters, which may be assigned a unique ID. The glyph may be embedded into a document once the customer indicates acceptance, e.g., by clicking an "ACCEPT" or "CONTINUE" button.

Figure 9:
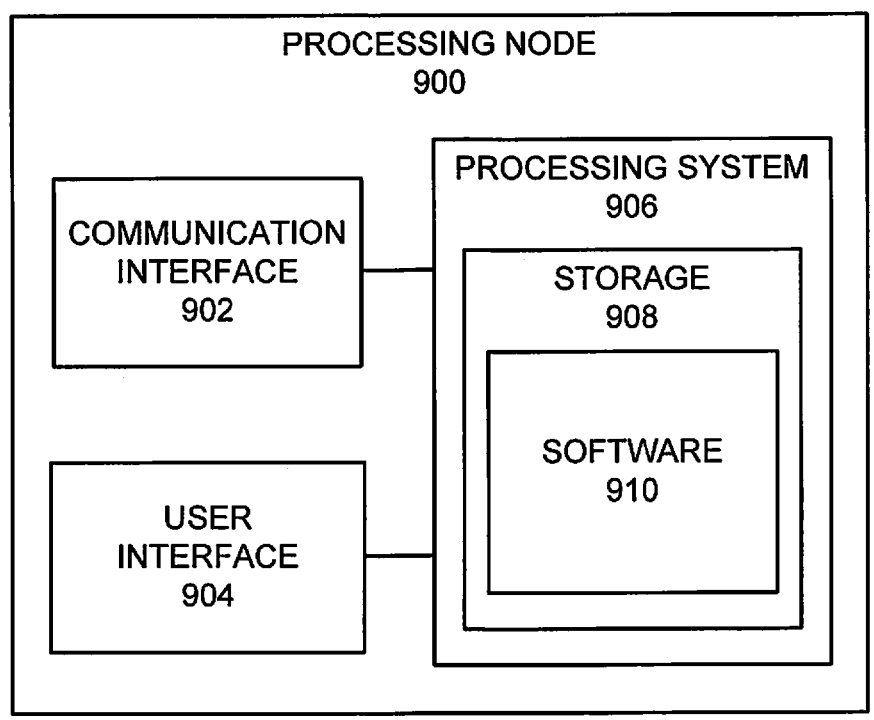
FIG. 9 illustrates an exemplary processing node suitable for use in various embodiments.

FIG. 9 illustrates an exemplary processing node in a communication system. Processing node 900 includes communication interface 902, user interface 904, and processing system 906 in communication with communication interface 902 and user interface 904. Processing node 900 may be configured to verify an authentication. Processing system 906 includes storage 908, which may include a disk drive, flash drive, memory circuitry, or other memory device. Storage 908 may store software 910 which is used in the operation of the processing node 900. Storage 908 may include a disk drive, flash drive, data storage circuitry, or some other memory apparatus. Software 910 may include computer programs, firmware, or some other form of machine-readable instructions, including an operating system, utilities, drivers, network interfaces, applications, or some other type of software. Processing system 906 may include a microprocessor and other circuitry to retrieve and execute software 910 from storage 908. Processing node 900 may further include other components such as a power management unit, a control interface unit, etc., which are omitted for clarity. Communication interface 902 permits processing node 900 to communicate with other network elements. User interface 904 permits the configuration and control of the operation of processing node 900.

Examples of processing node 900 include the verification device 106. Processing node 900 may be an adjunct or component of a network element, such as an element of verification device 106, or processing node 900 may be another network element of communication system 100. Further, the functionality of processing node 900 may be distributed over two or more network elements of a communication system.

The exemplary systems and methods described herein may be performed under the control of a processing system executing computer-readable codes embodied on a non-transitory computer-readable recording medium or communication signals transmitted through a transitory medium. The non-transitory computer-readable recording medium is any data storage device that may store data readable by a processing system, and includes both volatile and nonvolatile media, removable and non-removable media, and contemplates media readable by a database, a computer, and various other network devices.

Examples of the non-transitory computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium may be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above may be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method of managing a document with an authenticated document biosignature, comprising:
   receiving, by a processor of a verification device, an image based on a user selection;
   receiving, by the processor, at least one identification input comprising two or more identification features of differing types, wherein the two or more identification features include a biometric identification feature;
   calculating, by the processor, a base verification score associated with a user using values that represent the two or more identification features;
   generating, by the processor, a glyph based on the base verification score, the at least one identification input, and the selected image; and
   associating the glyph with a document.

2. The method of claim 1, wherein the identification input further comprises a feature validity rating of each identification feature.

3. The method of claim 1, wherein the identification input further comprises a source where each of the two or more identification features are received and a respective source validity rating.

4. The method of claim 1, wherein generating the glyph based on the base verification score, the at least one identification input, and the selected image comprises:
   encoding the base verification score; and
   generating the glyph based on the encoded base verification score.

5. The method of claim 1, wherein generating the glyph based on the base verification score, the at least one identification input, and the selected image comprises:
   encoding the two or more identification features; and
   generating the glyph based on the encoded two or more identification features.

6. The method of claim 1, wherein generating the glyph based on the base verification score, the at least one identification input, and the selected image comprises:
   encoding a feature validity rating of each identification feature; and
   generating the glyph based on the encoded feature validity rating.

7. The method of claim 1, wherein generating the glyph based on the base verification score, the at least one identification input, and the selected image comprises:
   encoding a source where each of the two or more identification features are received; and
   generating the glyph based on the encoded source where each of the two or more identification features are received.

8. The method of claim 1, wherein generating the glyph based on the base verification score, the at least one identification input, and the selected image comprises:
   encoding a source validity rating for a respective source where each of the two or more identification features are received; and
   generating the glyph based on the encoded source validity rating.

9. The method of claim 1, wherein generating the glyph based on the base verification score, the at least one identification input, and the selected image comprises:
   encoding a session verification score; and
   generating the glyph based on the encoded session verification score.

10. The method of claim 1, wherein generating the glyph based on the base verification score, the at least one identification input, and the selected image comprises:
    modifying the selected image based on the base verification score, the at least one identification input, and the selected image.

11. The method of claim 1, further comprising:
    scanning the glyph associated with the document to extract at least one of the base verification score and the at least one identification input;

determining whether the extracted at least one of the base verification score and the at least one identification input matches at least one of the base verification score and the at least one identification input that are stored in a memory; and determining whether the glyph is authenticated in response to determining that the extracted at least one of the base verification score and the at least one identification input matches the stored at least one of the base verification score and the at least one identification input.

12. A verification device for generating an authenticated document biosignature, comprising:
a memory; and
a processor coupled to the memory and configured with processor-executable instructions to perform operations comprising:
receiving an image based on a user selection;
receiving at least one identification input comprising two or more identification features of differing types, wherein the two or more identification features include a biometric identification feature;
calculating a base verification score associated with a user using values that represent the two or more identification input features;
generating a glyph based on the base verification score, the at least one identification input, and the selected image; and
associating the glyph with a document.

13. The verification device of claim 12, wherein the processor is configured with processor-executable instructions to perform operations such that the identification input further comprises a feature validity rating of each identification feature.

14. The verification device of claim 12, wherein the processor is configured with processor-executable instructions to perform operations such that the identification input further comprises a source where each of the two or more identification features are received and a respective source validity rating.

15. The verification device of claim 12, wherein the processor is configured with processor-executable instructions to perform operations such that generating the glyph based on the base verification score, the at least one identification input, and the selected image comprises:
encoding the base verification score; and
generating the glyph based on the encoded base verification score.

16. The verification device of claim 12, wherein generating the glyph based on the base verification score, the at least one identification input, and the selected image comprises:
encoding the two or more identification features; and
generating the glyph based on the encoded two or more identification features.

17. The verification device of claim 12, wherein the processor is configured with processor-executable instructions to perform operations such that generating the glyph based on the base verification score, the at least one identification input, and the selected image comprises:
encoding a feature validity rating of each identification feature; and
generating the glyph based on the encoded feature validity rating.

18. The verification device of claim 12, wherein the processor is configured with processor-executable instructions to perform operations such that generating the glyph based on the base verification score, the at least one identification input, and the selected image comprises:
encoding a source where each of the two or more identification features are received; and
generating the glyph based on the encoded source where each of the two or more identification features are received.

19. The verification device of claim 12, wherein the processor is configured with processor-executable instructions to perform operations such that generating the glyph based on the base verification score, the at least one identification input, and the selected image comprises:
encoding a source validity rating for a respective source where each of the two or more identification features are received; and
generating the glyph based on the encoded source validity rating.

20. The verification device of claim 12, wherein the processor is configured with processor-executable instructions to perform operations such that generating the glyph based on the base verification score, the at least one identification input, and the selected image comprises:
encoding a session verification score; and
generating the glyph based on the encoded session verification score.

21. The verification device of claim 12, wherein the processor is configured with processor-executable instructions to perform operations such that generating the glyph based on the base verification score, the at least one identification input, and the selected image comprises:
modifying the selected image based on the base verification score, the at least one identification input, and the selected image.

22. The verification device of claim 12, wherein the processor is configured with processor-executable instructions to perform operations further comprising:
scanning the glyph associated with the document to extract at least one of the base verification score and, the at least one identification input;
determining whether the extracted at least one of the base verification score and the at least one identification input matches at least one of the base verification score and the at least one identification input that are stored in a memory; and
determining whether the glyph is authenticated in response to determining that the extracted at least one of the base verification score and the at least one identification input matches the stored at least one of the base verification score and the at least one identification input.

* * * * *